United States Patent [19]

Gordon et al.

[11] Patent Number: 5,424,534
[45] Date of Patent: Jun. 13, 1995

[54] RETAIL CHECKSTAND DEVICE WITH REMOVABLE CONTROLLER

[75] Inventors: Roderick J. Gordon; Andrew W. Soldzien, both of Peterborough, Canada

[73] Assignee: Rodlin Instruments, Inc., Peterborough, Canada

[21] Appl. No.: 101,381

[22] Filed: Aug. 2, 1993

[51] Int. Cl.⁶ .................. G01N 9/04; G06M 7/00; H01J 40/14
[52] U.S. Cl. .................. 250/223 R; 250/239
[58] Field of Search ............ 250/223 R, 221, 222.1, 250/239; 186/68, 59

[56] References Cited

U.S. PATENT DOCUMENTS

| | | | |
|---|---|---|---|
| 2,776,730 | 1/1957 | Crawford | 186/1 |
| 2,893,517 | 7/1959 | Sundberg | 186/1 |
| 3,066,760 | 12/1962 | Brigham et al. | 186/1 |
| 3,076,528 | 2/1963 | Potrafke | 186/1 |
| 3,109,515 | 11/1963 | Schild | 186/1 |
| 3,280,328 | 10/1966 | Gieskieng | 250/83.3 |
| 3,366,236 | 1/1968 | Breazeale | 209/111.5 |
| 3,489,247 | 1/1970 | Arneth | 186/1 |
| 3,561,566 | 2/1971 | Potrafke | 186/1 |
| 3,651,890 | 3/1972 | Potrafke | 186/1 A |
| 3,661,284 | 5/1972 | Traube | 214/152 |
| 3,688,873 | 9/1972 | Potrapke | 186/1 A |
| 3,690,411 | 9/1972 | Potrafke | 186/1 A |
| 3,817,355 | 6/1974 | Haase | 186/1 A |
| 4,015,123 | 3/1977 | Small et al. | 250/223 R |
| 4,037,103 | 7/1977 | Ryden, Jr. | 250/341 |
| 4,061,205 | 12/1977 | Musser | 186/1 A |
| 4,138,000 | 2/1979 | Hartup | 186/1 A |
| 4,182,433 | 1/1980 | Foster | 186/1 AA |
| 4,236,604 | 12/1980 | Warner | 186/61 |
| 4,265,336 | 5/1981 | Foster | 186/66 |
| 4,268,756 | 5/1981 | Crouse et al. | 250/551 |
| 4,354,106 | 10/1982 | Walter | 250/239 |
| 4,386,679 | 6/1983 | Mary | 186/68 |
| 4,392,553 | 7/1983 | Foster | 186/61 |
| 4,401,189 | 8/1983 | Majewski | 186/68 |
| 4,474,288 | 10/1984 | Majewski | 198/816 |
| 4,618,032 | 10/1986 | Woolf | 186/61 |
| 4,953,664 | 9/1990 | Vrodman et al. | 186/59 |
| 5,149,947 | 9/1992 | Collins et al. | 235/462 |
| 5,154,260 | 1/1992 | Patel et al. | 186/55 |
| 5,178,234 | 1/1993 | Sakuraki et al. | 186/61 |

FOREIGN PATENT DOCUMENTS 9214233 8/1992 WIPO.

Primary Examiner—David C. Nelms
Assistant Examiner—S. Nichols
Attorney, Agent, or Firm—Thomas A. O'Rourke

[57] ABSTRACT

A retail check stand device has a conveyor and a pair of side walls, each of the side walls further including a side wall section presenting an inner planar surface on a respective side of the conveyor to confine articles. One of the side wall sections has a cavity adjacent the planar surface. A sensing means is provided to sensing objects on the conveyor. An opening is formed in the side wall section to provide access to the cavity. A check stand controller is responsive to the sensing means and is arranged to fit through the opening and be located in the cavity.

23 Claims, 19 Drawing Sheets

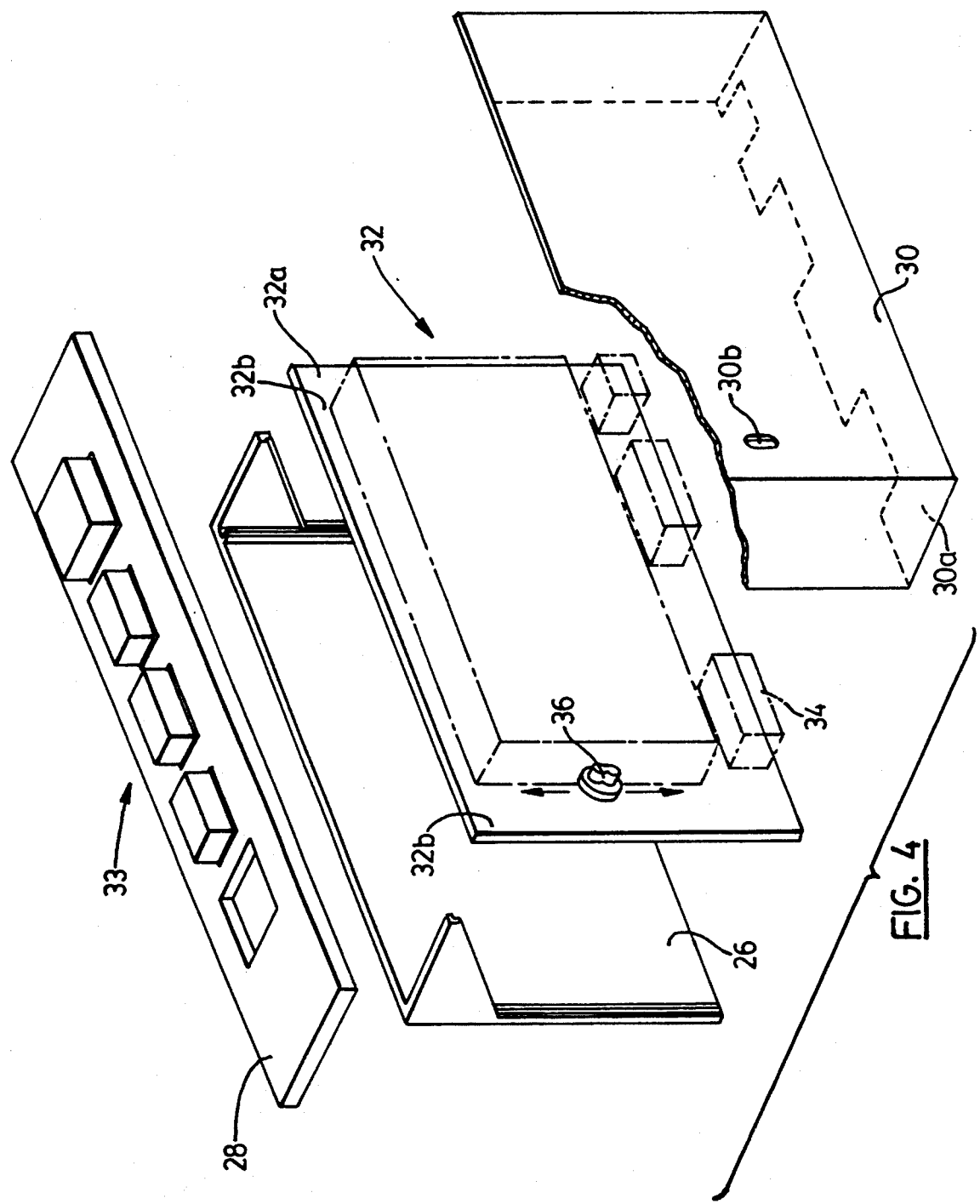

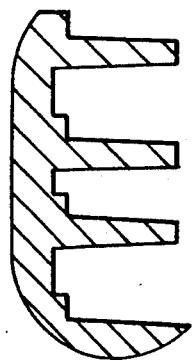
FIG. 11
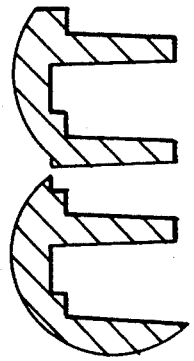
FIG. 12
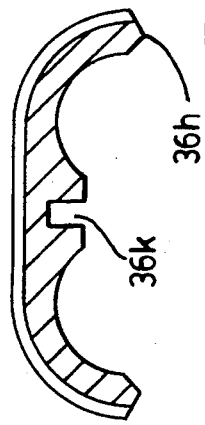
FIG. 10
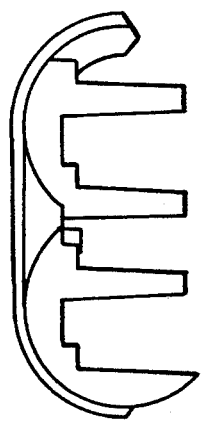
FIG. 13
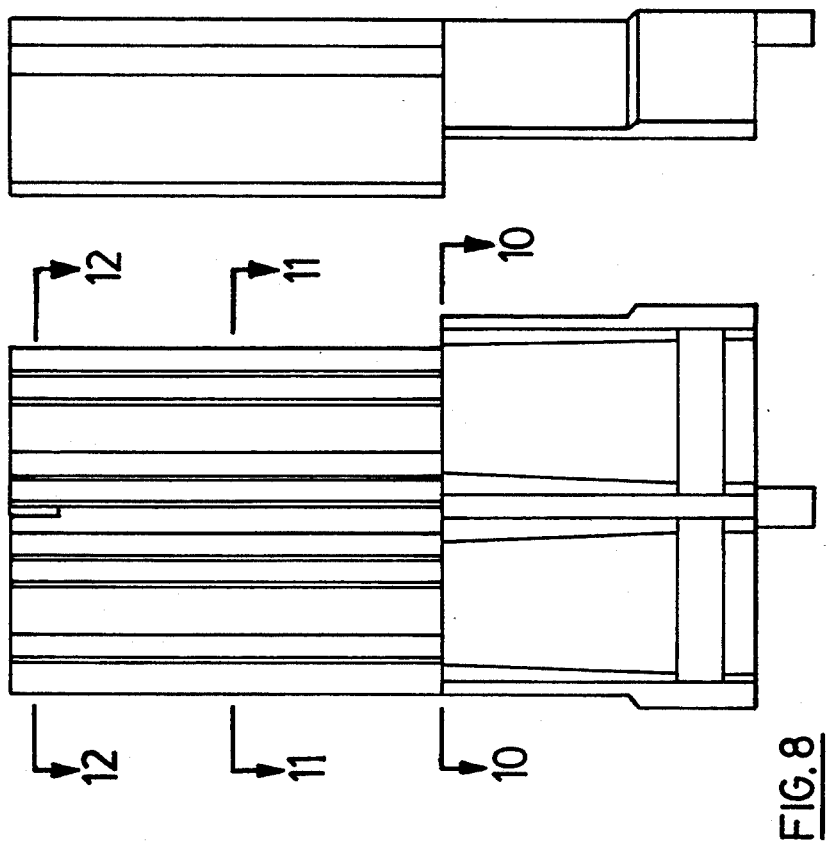
FIG. 9
FIG. 8

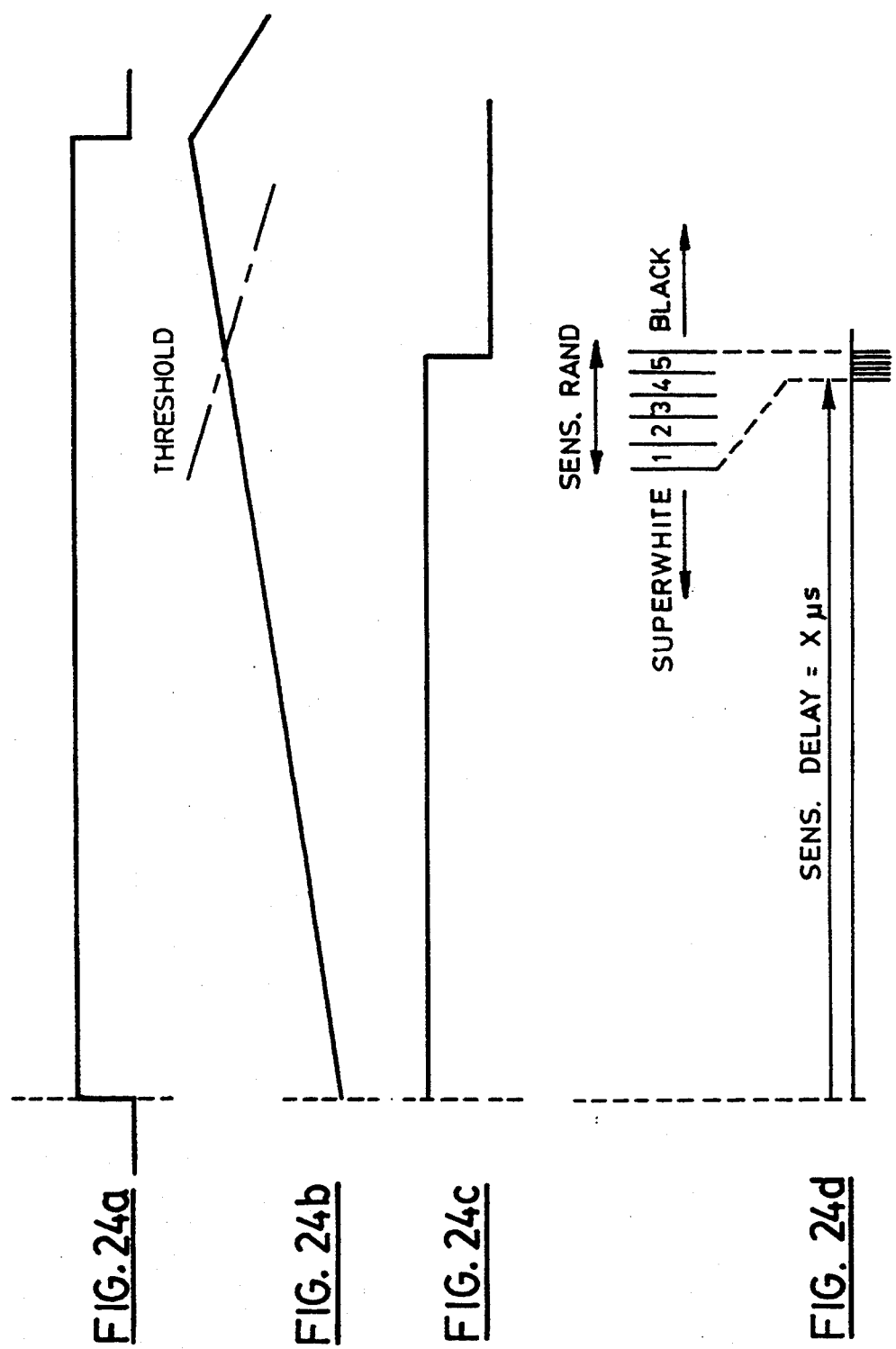

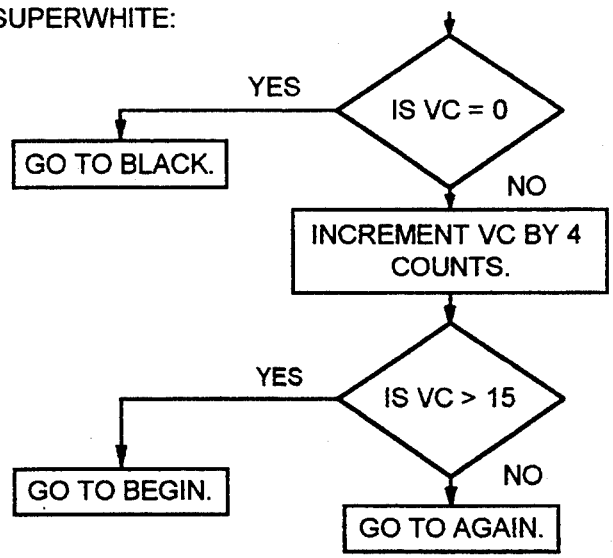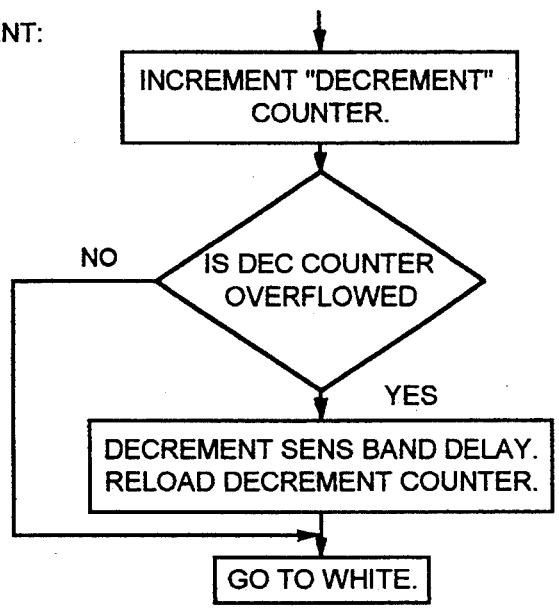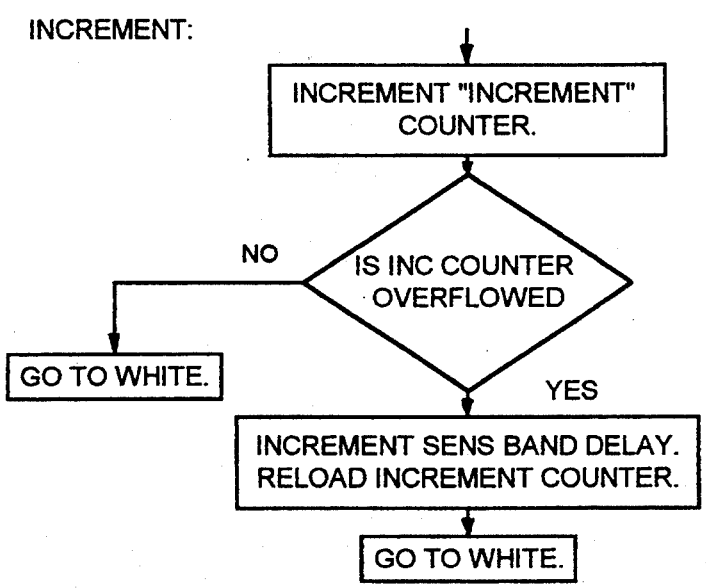
FIG. 26c 5,424,534

RETAIL CHECKSTAND DEVICE WITH REMOVABLE CONTROLLER

BACKGROUND OF THE INVENTION

1. Field of the Invention

The present invention relates to conveyor devices.

2. Description of the Related Art

The retail food industry has seen significant gains in productivity in recent years. Greater volumes of food products can be passed through check-stands, thanks to the use of self bagging and double and triple belted check-stands.

Modern check-stand control systems use optical signalling to control the motion of the conveyor depending on the presence or absence of food products. In most cases, this involves the use of an emitter/receiver pair of optical units located on opposite sides of the conveyor. The optical units, along with the conveyor motors and the like, are controlled by a check-stand control.

Conventionally, these components are mounted in separate locations in the check-stand. Servicing requires that each component be dealt with separately and by skilled technicians. However, skilled technicians are often in short supply causing delays and adding to the expensive down time. It would be desirable, therefore, to provide a conveyor control device that is complete and self contained so that rectification of any fault in the conveyor control system can be achieved by any non-skilled person by simply replacing the control device.

It is therefore an object of the present invention to provide a novel conveyor device.

SUMMARY OF THE INVENTION

Briefly stated the invention involves a conveyor device, comprising a pair of side walls, one of the side walls having a top face, a conveyor supported between the side walls and having a surface to receive objects, a housing, sensing means for sensing the objects, control means including a first electrical circuit contained within the housing and responsive to the sensing means for controlling the conveyor, the control means further including switch means for operating the control means, the switch means being exposed from the housing, the side wall including mounting means for removably mounting the housing in the side wall near the top face so that the switch means are within easy reach of an operator, the mounting means and the housing being arranged to disable the control means when the housing is disengaged from the mounting means.

In another aspect of the present invention, there is provided a binocular optic device comprising a housing to contain a light emitting element and a light receiving element, divergence control means to control the divergence angles of light emitted by the light emitting element or received by the light receiving element, the divergence control means including a plurality of optical passages to be adjacent the light emitting element and the light receiving element.

In yet another aspect of the present invention, there is provided a technique for processing an optical signal comprising the steps of:
  providing a received an optical signal;
  converting the received optical signal into an electrical signal;
  providing a capacitor to receive the electrical signal, the capacitor including an output to convey a capacitor output signal whose rate of change varies in proportion to the magnitude of the electrical signal;
  comparing the capacitor output signal with a threshold value, and conveying a comparator output signal when the capacitor output signal equals the threshold value; and
  counting increments of time from a change in the optical signal to the comparator output signal, wherein the count is a time based measure of the magnitude of the received optical signal.

BRIEF DESCRIPTION OF THE DRAWINGS

Preferred embodiments of the present invention are illustrated, by way of example only, in the appended drawings, in which:

FIG. 4 is a fragmentary exploded view of a portion of the check-stand illustrated in FIG. 3a;

FIG. 8 is a side view of a first component of the device illustrated in FIG. 6;

FIG. 9 is another side view of the component illustrated in FIG. 8;

FIG. 10 is a sectional view taken on line 10—10 of FIG. 8;

FIG. 11 is a sectional view taken on line 11—11 of FIG. 8;

FIG. 12 is a sectional view taken on line 12—12 of FIG. 8;

FIG. 13 is an end view of the component illustrated in FIG. 8;

FIGS. 24a) to 24c) are sketches representative of time versus capacitor charge;

FIG. 24d is a sketch representative of a Sensitivity Band

FIG. 26a to 26d) are flow diagrams illustrating an operational mode of the check-stand illustrated in FIG. 1.

DESCRIPTION OF THE PREFERRED EMBODIMENTS

Figure 1:
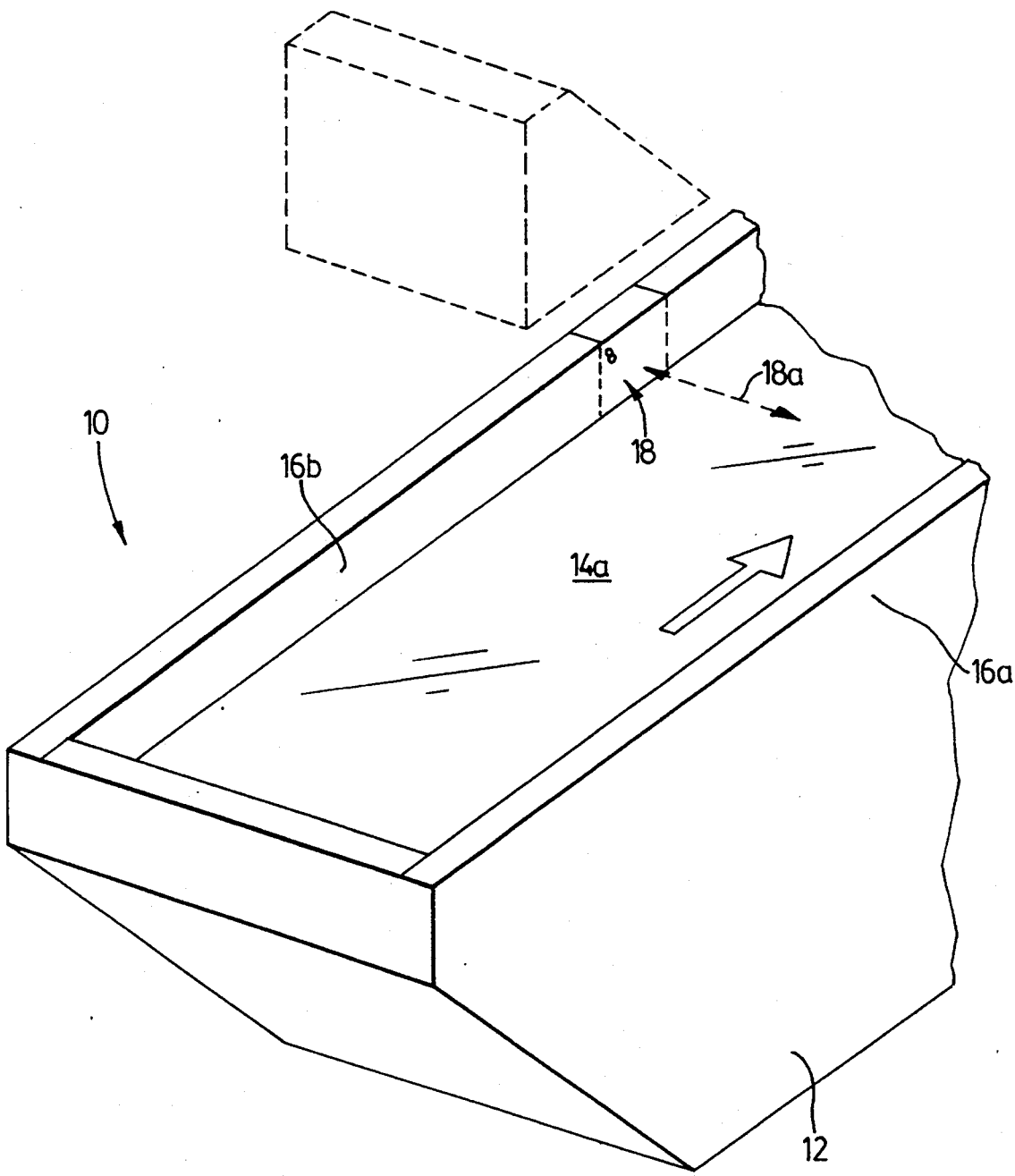
FIG. 1 is a fragmentary perspective view of a check-stand.

Referring to the figures, there is provided a check-stand 10 of the type found in supermarkets. The check-stand 10 has a housing 12 which supports a front conveyor 14a and two rear conveyors 14b and 14c. The housing 12 includes a pair of front side walls 16a and 16b beside the conveyor 14a and three rear side walls 16c, 16d and 16e beside the rear conveyors 14b and 14c.

A particular feature of the present invention is the use of a pair of conveyor control devices, one shown at 18 to control the flow of consumer items along the front conveyor and the other shown at 19 to control the flow of consumer items along the rear conveyors.

Figure 3A:
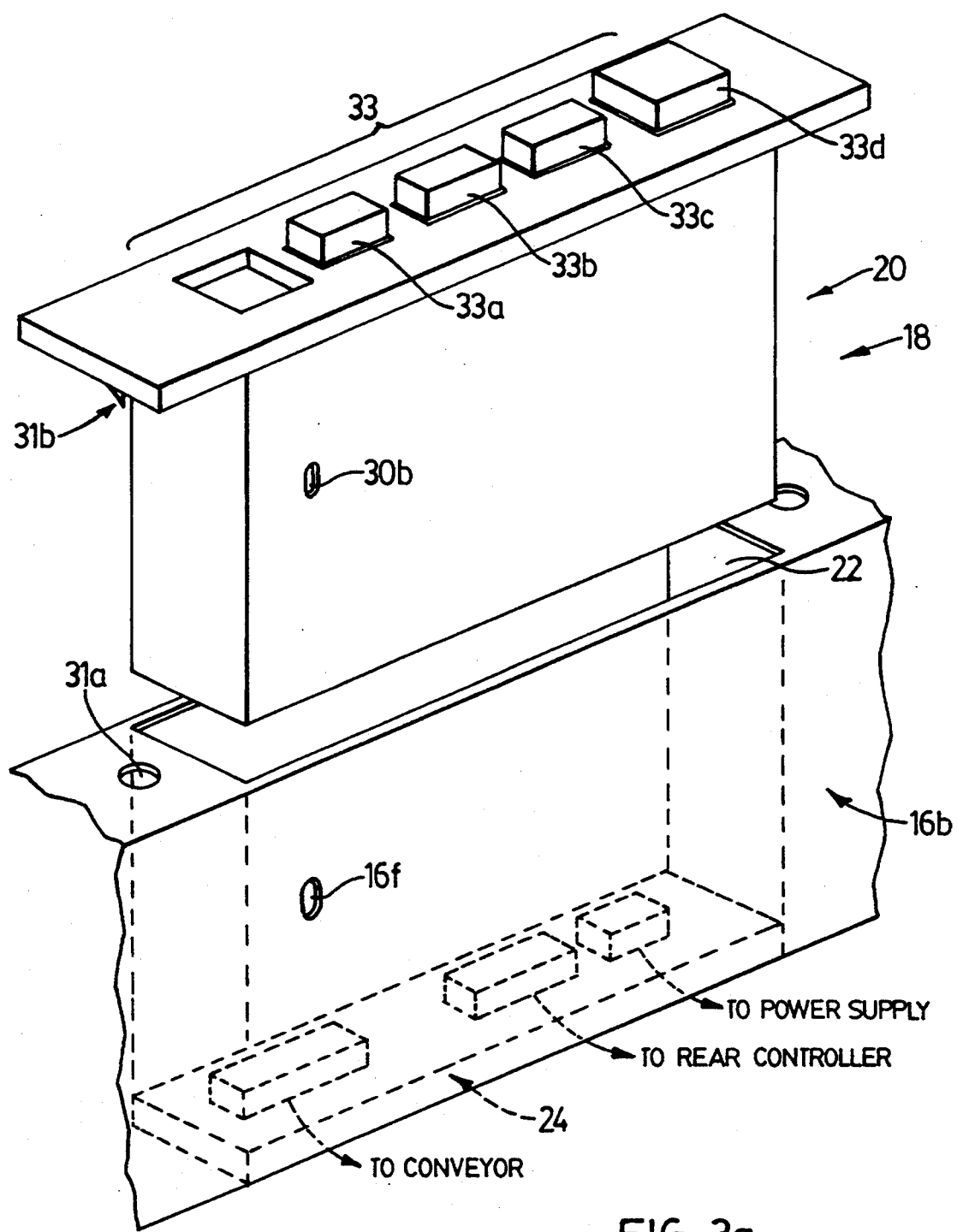
FIG. 3a is a fragmentary perspective assembly view of a portion of the check-stand illustrated in FIG. 1.

Referring to FIG. 3a, the front conveyor control device 18 has a housing 20 which is shaped complementary to a recess 22 formed in the side wall 16b. Located along the bottom of the recess 22 is a connector unit 24 which is shaped to fit a number of corresponding connectors on the front conveyor control device. The connectors permit the front conveyor control device 18 to be connected with a second electrical circuit, namely that for the front conveyor, the rear conveyor control device and power supply and to be disconnected therefrom simply by removing the conveyor control device 18 from the recess 22.

Referring to FIG. 4, the housing has a back wall 26, a cap 28 and a shroud 30. Attached to the back wall is a first electrical circuit including a control module 32 which controls:

i) the photo-electric sensing of objects on the conveyor;

ii) conveyor run timing, and;

iii) energizing of conveyor motors.

The control module 32 has a circuit board 32a and a number of connectors 34 along its lower edge to connect with the connector unit 24. The control module 32 also has a sensing means for sensing objects on the conveyor, in this case an optical means for generating the optical signal to establish a light path across the conveyor as well as for receiving the optical signal. The optical means is in the form of a binocular optic device 36 for generating and receiving light pulses along a light path 18a across the conveyor as shown in FIG. 1. The shroud 30 is formed from bent material and has a lower flange 30a with a number of recesses to expose the connectors 34 to the connector unit 24. The cap 28 includes a number of switches, indicator lights and the like as shown collectively at 33 which will be further described below. Both the shroud 30 and the sidewall 16b have aligned apertures 30b, 16f respectively to expose a binocular optic device 36.

Figure 5:
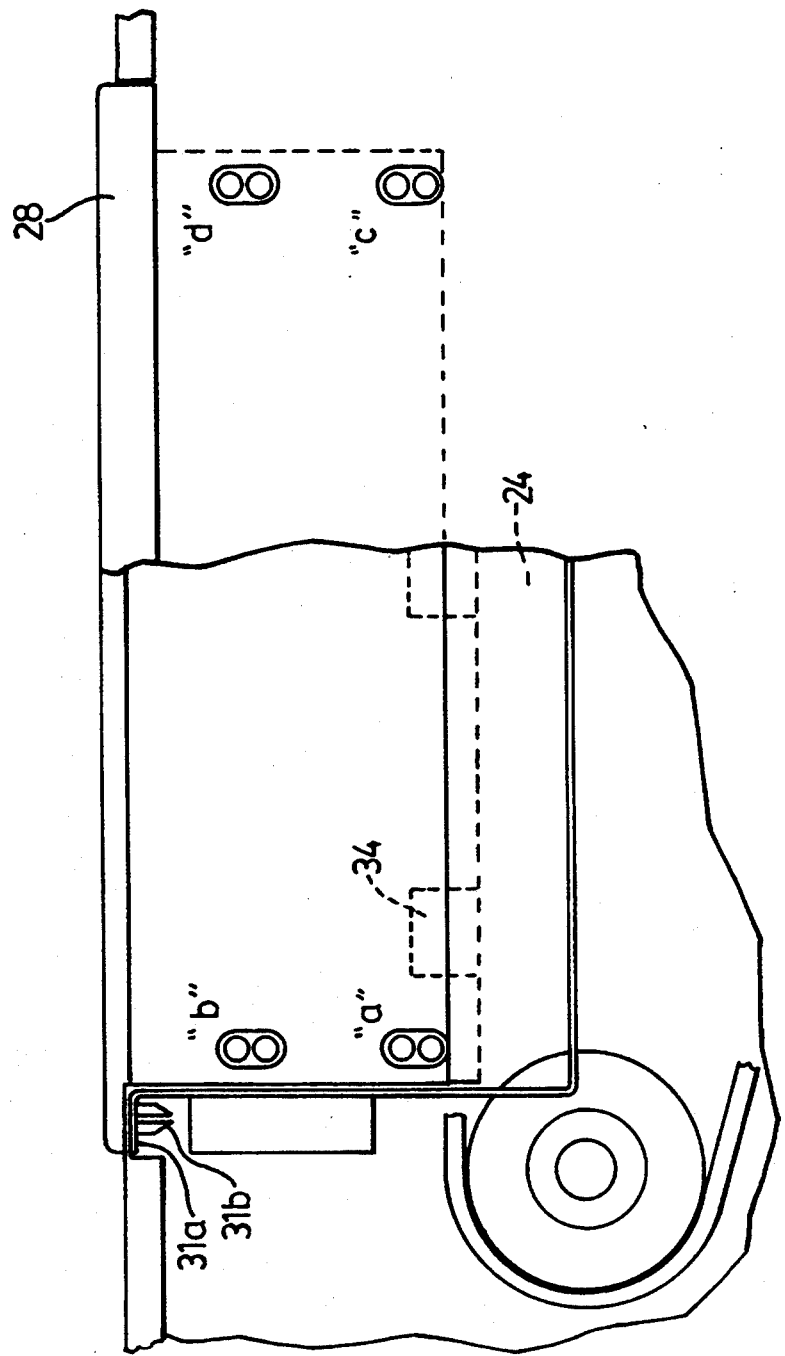
FIG. 5 is a fragmentary side view taken on arrow 5 of FIG. 1.

The control module 32 is arranged with a vertically oriented cavity along both ends of the circuit board as shown at 32b for locating and varying the position of the binocular optic device as desired, as illustrated in FIG. 5. This allows the module to adapt to a particular conveyor application and to a range of sidewall heights. For check-stands in particular, it is preferred that the binocular optic device be positioned immediately above the conveyor surface.

The sidewall 16b is further provided with mounting apertures 31a to receive a mounting pin 31b on each end of the cap 28. The apertures and pins 31a, 31b provide secure yet releasable mounting of the housing. Of course, other methods can be used to secure the housing in place.

Figure 2:
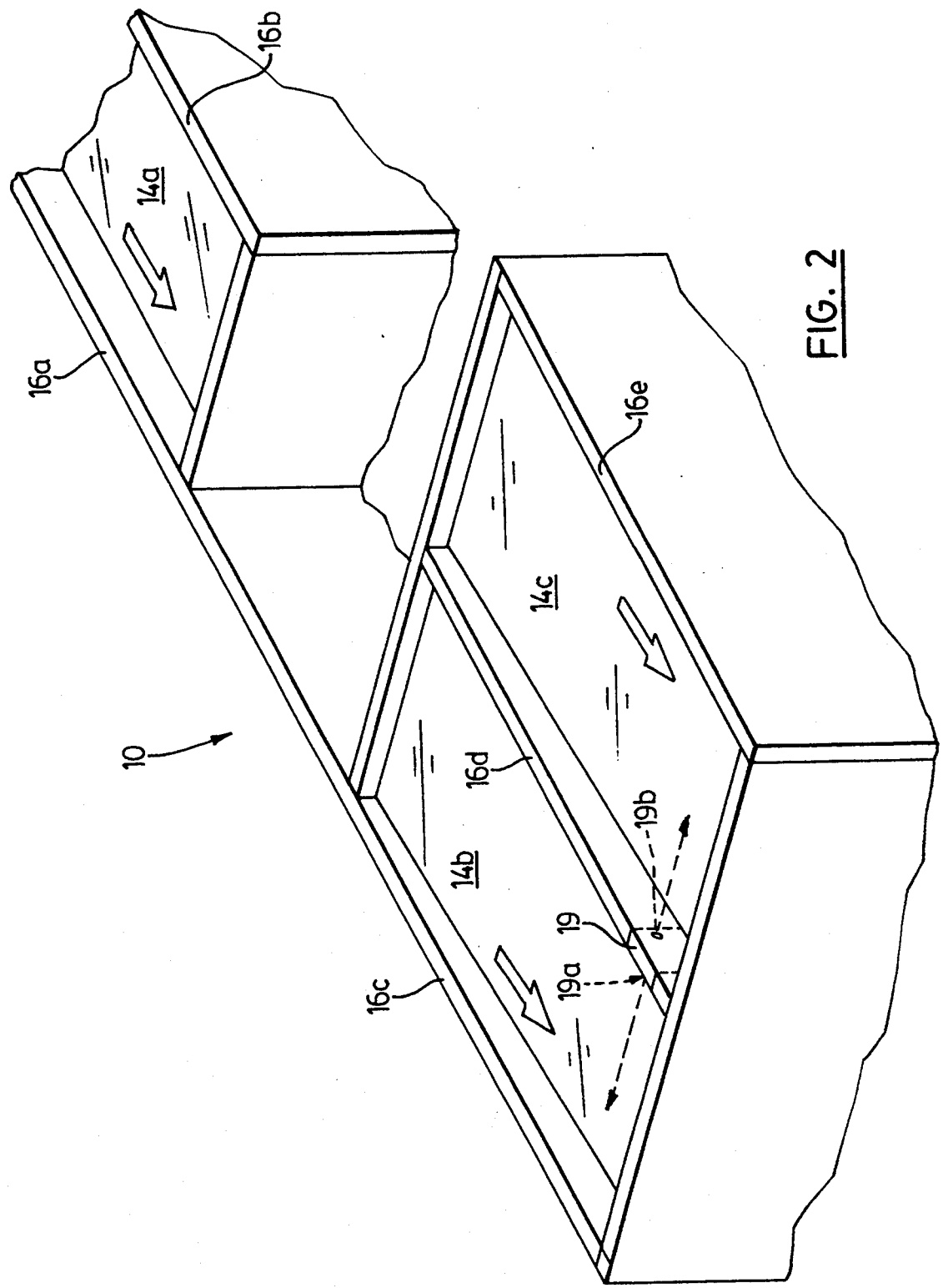
FIG. 2 is another fragmentary perspective view of the check-stand illustrated in FIG. 1.

Referring to FIG. 2, the rear conveyor control device 19 also includes a pair of binocular optic devices, as shown generally at 19a and 19b. In this case, the binocular optic devices 19a and 19b are aligned with passages on opposite sides of the rear side wall 16d to form light pathways 19c, 19d across the two rear belts 14b and 14c.

Figure 3B:
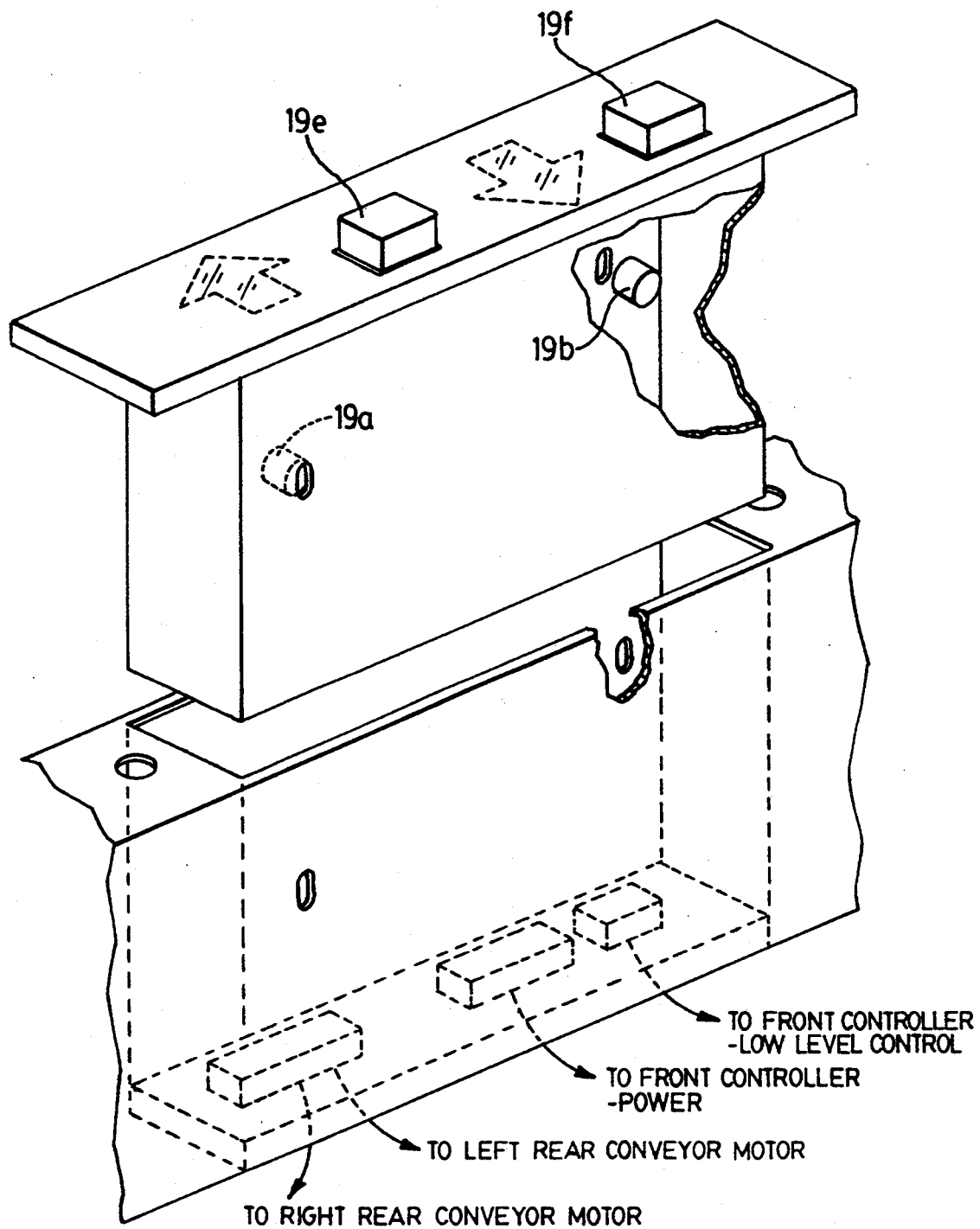
FIG. 3b is another fragmentary perspective assembly view of a portion of the check-stand illustrated in FIG. 1.

Referring to FIG. 3b, as with the front conveyor control device 18, the rear conveyor control device 19 has a housing that fits within a recess in the side wall 16d. Unlike the front conveyor control device 18, however, the rear conveyor control device 19 has two binocular optic devices 19a, 19b, each directed toward a respective rear conveyor. In addition, the rear conveyor control device 19 has a pair of push button switches 19e, 19f each for manual control of a respective rear conveyor, as will be described.

Referring to FIGS. 6 through 20, the binocular optic device includes a housing which has two adjacent cavities 36a, 36b, the first 36a to receive a light emitting element in the form of a light emitting diode (LED) 38, the second 36b to receive a light receiving element in the form of a photo-transistor 40. A particular feature of the binocular optic device is the use of a means to control the divergence angles of light emitted by the light emitting element or received by the light receiving element and thereby to define the boundaries of said first and second path segments. This divergence control means is in the form of an number of optical passages which are provided by an arrangement of vanes 36c. The vanes 36c which control the direction of light emitted by the LED and received by the photo-transistor, thereby improving the accuracy of the photo-electric sensing circuitry. Another particular feature of the housing is the manner in which it is made.

Figure 20A:
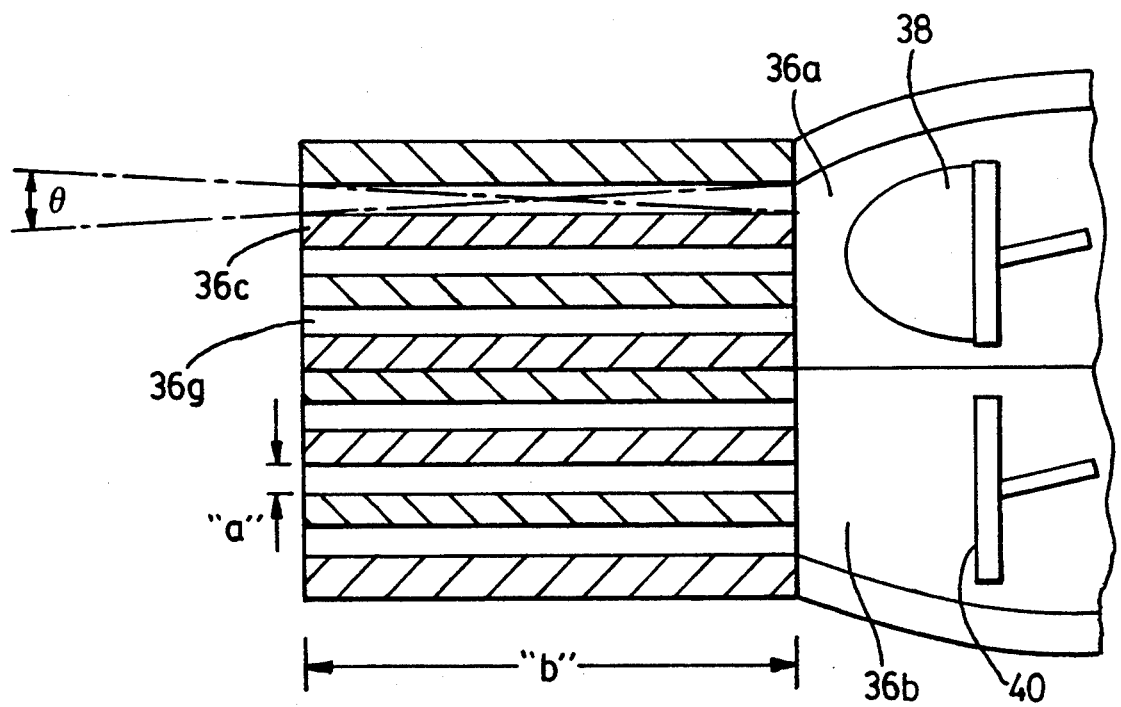
FIG. 20a is a sectional view of the device illustrated in FIG. 6.

Referring to FIG. 20a, the vanes are spaced to provide pathways with a width 'a' of preferably 0.030 inch and a length 'b' of preferably 0.650 inch. By keeping the pathways relatively narrow and long, these dimensions reduce the scatter of the light passing through the housing to an angle $\Theta$ of about 5.28 degrees.

Figure 7:
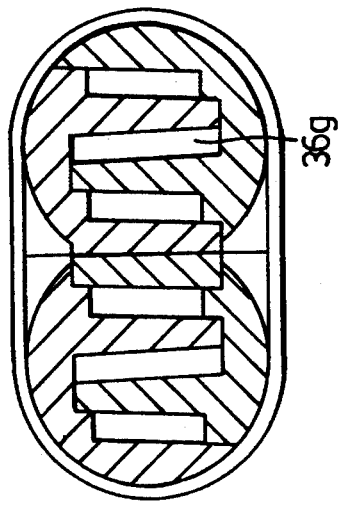
FIG. 7 is a sectional view taken on line 7—7 of FIG. 6.
Figure 6:
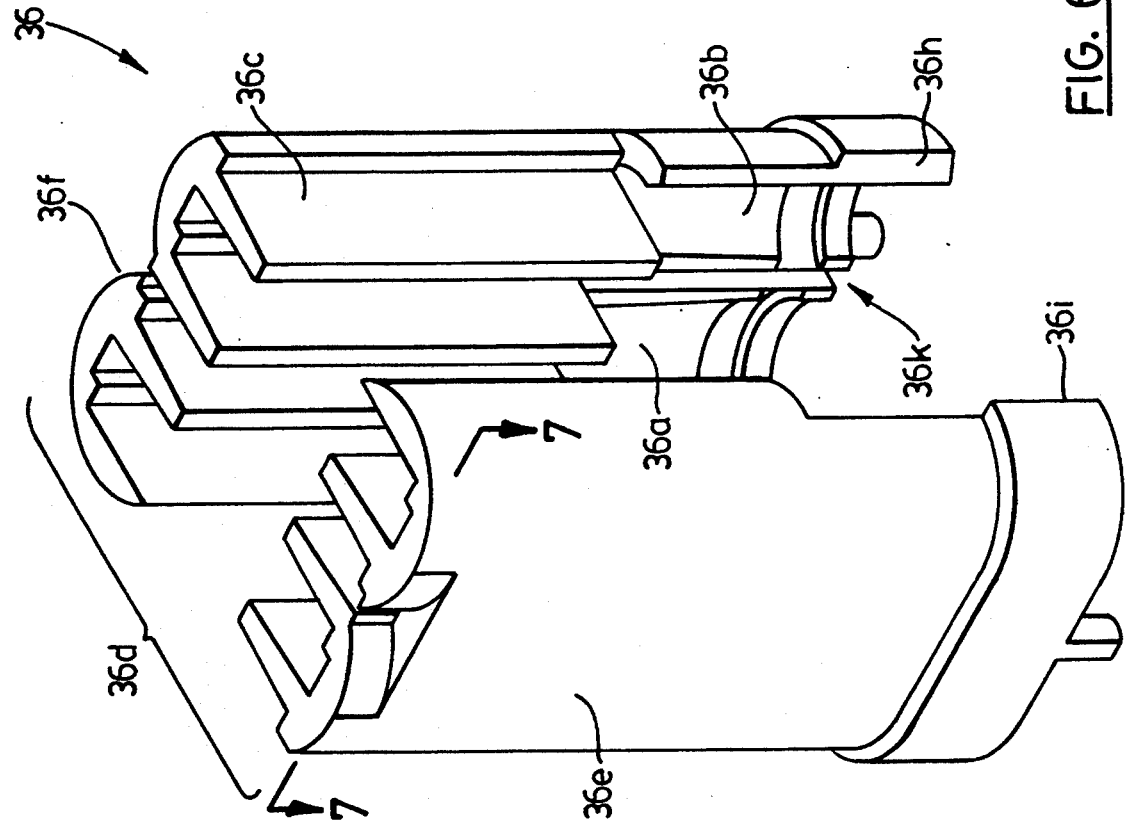
FIG. 6 is a perspective view of a binocular optic device.
Figure 19:
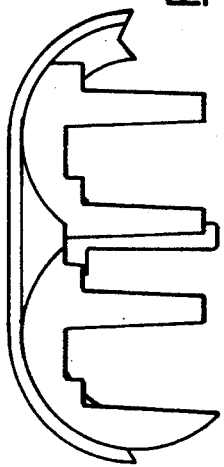
FIG. 19 is an end view of the component illustrated in FIG. 14.
Figure 17:
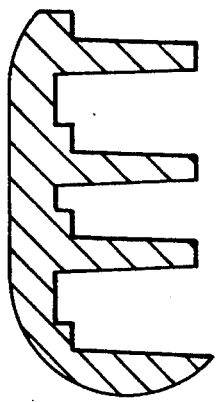
FIG. 17 is a sectional view taken on line 17—17 of FIG. 14.
Figure 18:
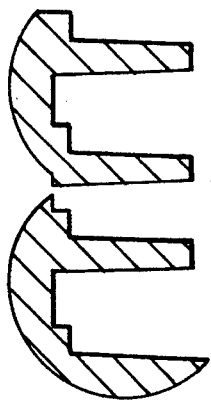
FIG. 18 is a sectional view taken on line 18—18 of FIG. 14.
Figure 16:
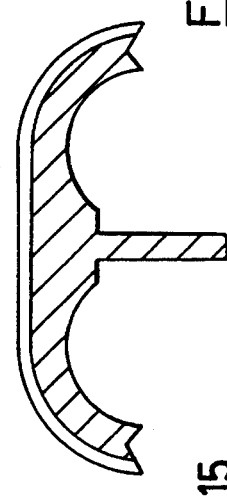
FIG. 16 is a sectional view taken on line 16—16 of FIG. 14.
Figure 15:
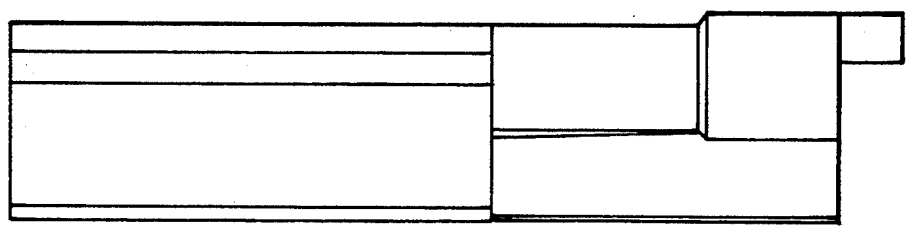
FIG. 15 is another side view of the component illustrated in FIG. 14.
Figure 14:
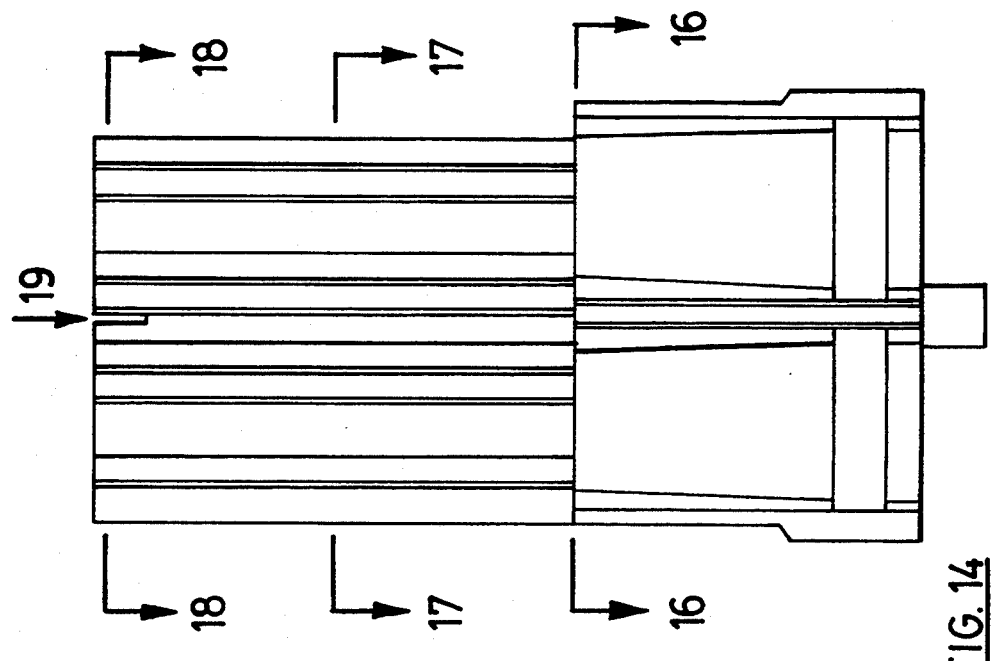
FIG. 14 is a side view of a second component of the device illustrated in FIG. 6.

The cavities 36a, 36b are formed in a housing 36d having two portions 36e, 36f. Each portion 36e, 36f includes alternating ones of the vanes 36c as shown the FIG. 6. In order to permit the housing to be ejected from a plastic injection mold, each of the vanes has a thin tapered cross section. Furthermore, the angle of the opposing faces on each vane is selected to match that of the adjacent faces when the portions 36e and 36f are nested as shown in FIG. 7 to form light pathways 36g.

It will be seen that, while the pathways 36g are inclined in the end view, they are nonetheless parallel in the side view and therefore are effective in reducing scatter.

The housings join along a pair of edge regions 36h, 36i that are shaped to prevent light leakage, by a 'V' shaped projection on edge region 36h and a 'V' shaped groove on edge region 36i. The cavities 36a and 36b are also separated by a central wall 36j, that fits within a recess 36k to prevent light leakage from one cavity to the other. In addition, a tight fit is provided between the central wall 36j and the recess 36k to provide a force fit to hold the housing portions together.

Figure 20B:
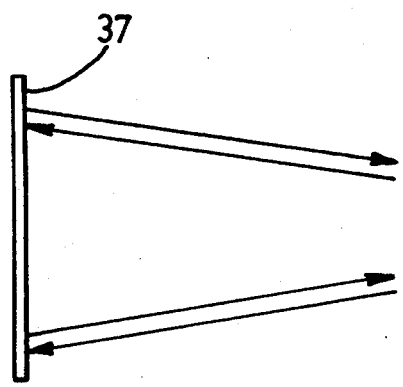
FIG. 20b is an optical diagram for light waves produced by the device illustrated in FIG. 6.
Figure 21:
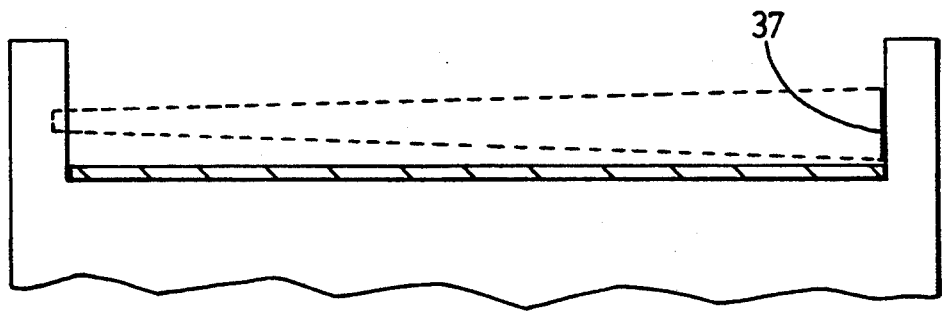
FIG. 21 is a schematic sectional view of the check-stand illustrated in FIG. 1.
Figure 22:
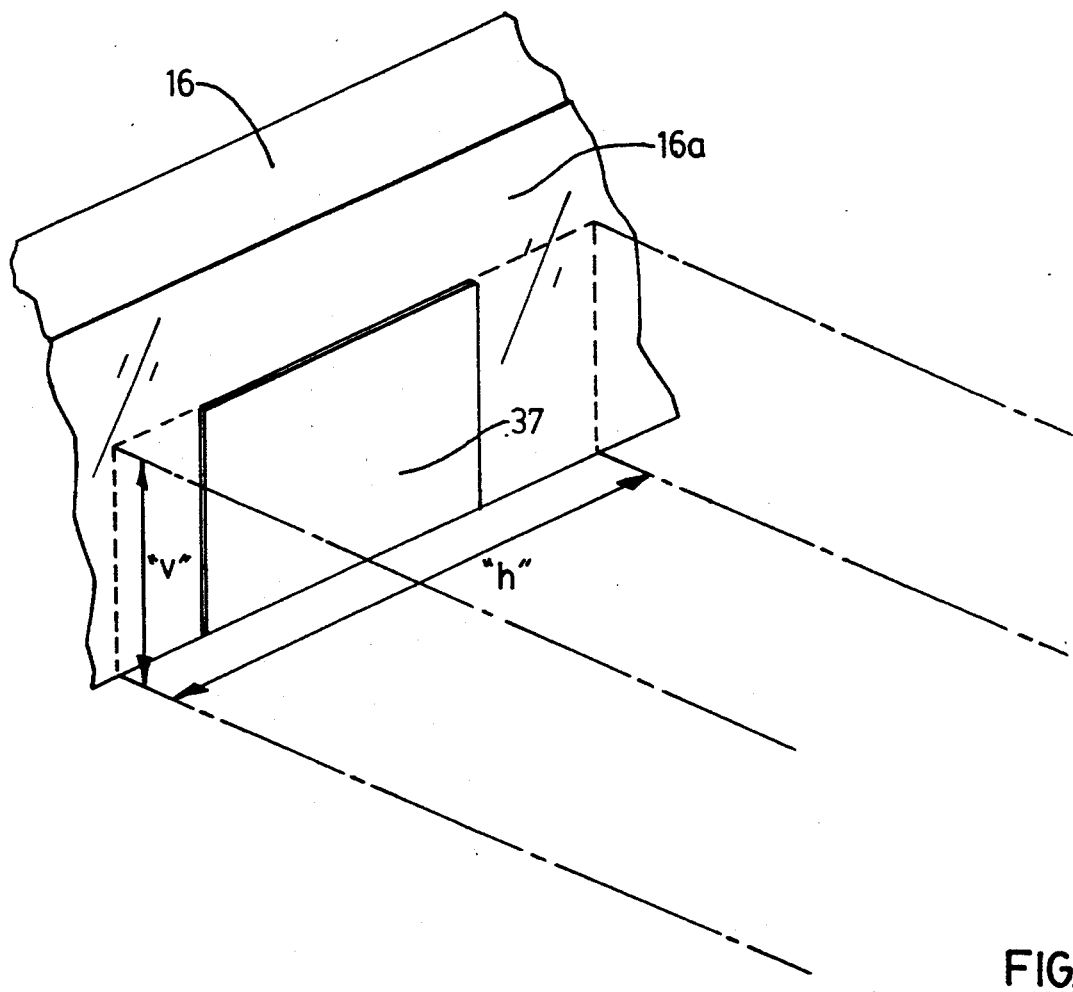
FIG. 22 is a fragmentary schematic view of a portion of the check-stand illustrated in FIG. 1.

The binocular unit is preferably aimed at a reflective surface in the form of a piece of reflective tape of the type sold under the tradename 'Scotchlite' manufactured by 3M as illustrated at 37 in FIGS. 21 and 22. The tape 37 is believed to have a prism-like particle surface which causes incident light to be reflected back to the source as shown in FIG. 20b.

The vanes function to form a first path segment originating from the LED to the reflective surface and a second path segment originating from the reflective surface to the photo-detector, and to minimize overlap of the outgoing optical signal from the LED on the first path segment and the reflected incoming signal on the second path segment. For check-stands in particular, it is preferred that the binocular optic device be positioned immediately above the conveyor surface and with the vanes of the binocular optic device parallel to the conveyor surface.

In the case of the check-stand 10, the binocular optic device is directed at the reflective surface mounted on the opposite sidewall, for example, a 1 inch (high)×2 inch (wide) patch of reflective tape 37. As shown in FIGS. 21 and 22, the vanes are conveniently arranged to limit the vertical field for the photo-transistor to the face of the side wall. The vertical field will vary according to the spacing between the binocular optic device and its target or the dimensions of the light pathways 36g. While the horizontal field of view is not restricted significantly by the vanes, the sidewall will reflect a substantially less degree of light than the reflective tape.

Because the electrical functions are entirely controlled by the self contained circuity of the front conveyor control device, the wiring harnesses are needed only to join the motors, the power supply and the front and rear conveyor control devices together.

By combining the switching control for the conveyors in the front and rear conveyor control devices, the check-stand 10 substantially reduces the complexity of conventional check-stands. Should repair be necessary, service technicians can simply replace the front conveyor control device, or in the unlikely event that a conveyor motor needs servicing, installation is simplified since the number of connections and wiring is greatly reduced.

Figure 23:
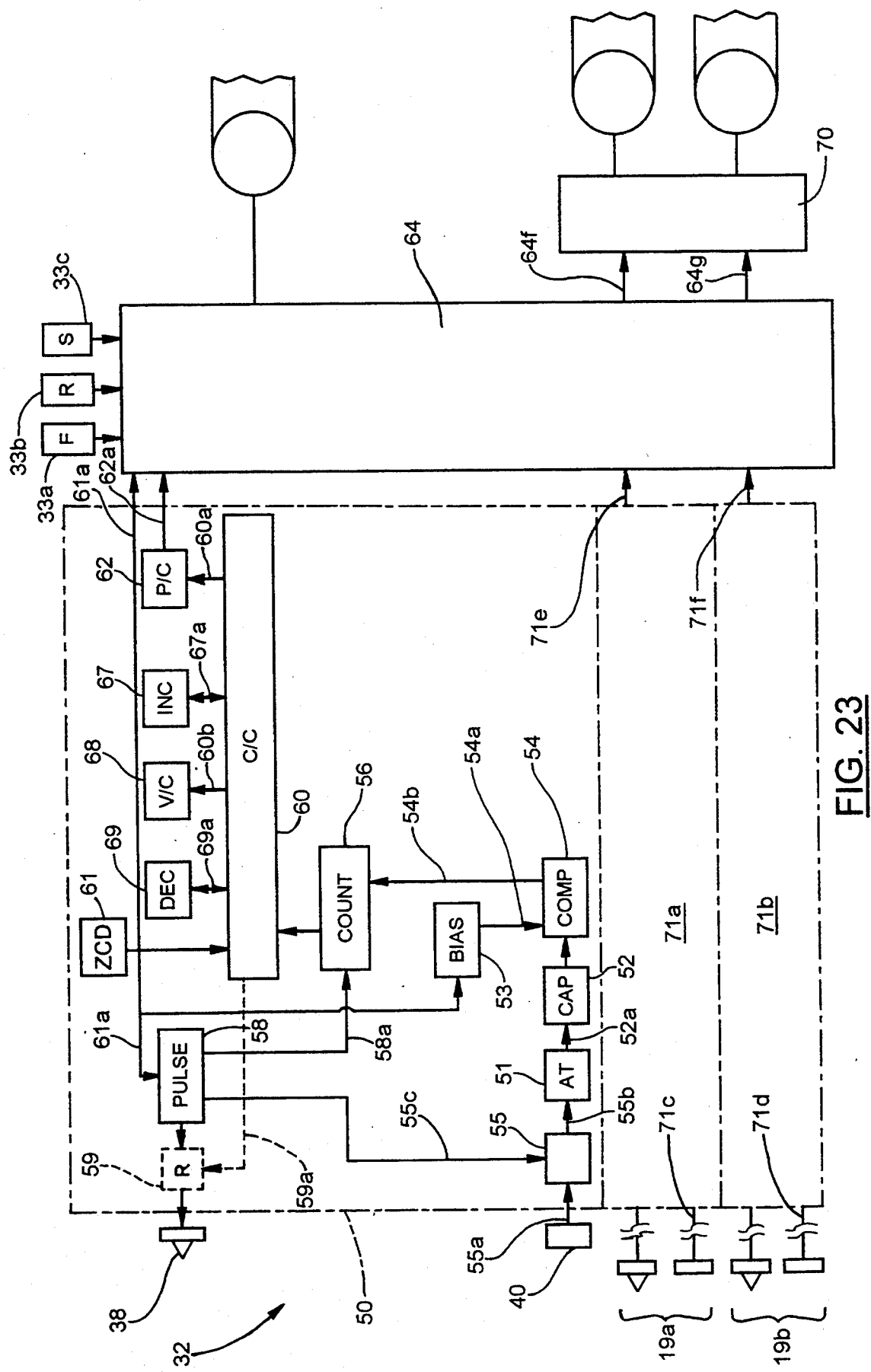
FIG. 23 is a schematic view of a control module portion of the component illustrated in FIG. 4.

The control module 32 will now be described with reference to FIGS. 23 and 23a. Referring to FIG. 23, the control module 32 includes a calibration unit shown at 50 to calibrate the control module on a continuous basis and a motor controller 64 to control the timing and travel of the conveyors. The calibration unit 50 has an ambient light compensator 55 which receives a photo-current signal from the photo-transistor 40 on conductive path 55a. The ambient light compensator 55 includes a constant current sink and, in a manner to be described, compensates for an ambient light component in the signal and conveys the signal to the attenuator 51 along conductive path 55b. The attenuator 51 sets the scaling of the signal to one of two or more preset ranges and then conveys the scaled signal to a capacitor 52 via conductive path 52a, the magnitude of the attenuator output affecting the slope, or rate of change, of the capacitor charge. A comparator 54 is coupled to the capacitor 52 to receive a signal representative of the capacitor charge. Comparator 54 also receives a time varying bias threshold level (as will be described) on conductive path 54a from a threshold generator 53.

As an alternative to attenuating the received signal in the control module of the conveyor control device, the LED light pulse may instead be varied, by way of a level control means for controlling the intensity of the optical pulse. This may be done through the use of a resistor arrangement, shown in dashed lines at 59, to vary the level of power being delivered to the LED.

The comparator 54 generates an output on conductive path 54b which will switch as the capacitor voltage passes the threshold value. A counter 56 receives the comparator output on path 54b and a signal from a pulse generator 58 along path 58a. The pulse generator 58 interrogates the LED 38, to cause a pulse of light to be emitted from the binocular optic device.

Another particular feature of the control module 32 is the means by which it accommodates the sensitivity of the phototransistor which is diminished in the presence of low ambient light. To that end, the pulse from the binocular optic device is in fact a two stage pulse. The first stage, in effect, simulates a minimum level of ambient light to the phototransistor, which enhances the sensitivity of the phototransistor in low ambient light. The second stage is the interrogation pulse itself.

Except for the period of time during which the second stage of the signal occurs, the ambient light compensation unit continually adjusts its constant current sink to the current generated by the photo-transistor. During the second stage of the signal, the constant current sink maintains a current at the level determined immediately prior to the second stage of the signal. This enables the constant current sink to isolate and nullify the ambient component of the signal and to permit thee pulse to pass through the attenuator and on to the capacitor on conductive path 52a.

The counter 56 communicates with a calibration controller 60 which monitors the condition of the calibration unit 50 to make minor changes to the calibration of the control module as can be necessary due to fluctuations in power feed, ambient light levels, temperature and the like. The calibration controller also communicates with a photo-counter 62 via conductive path 60a and a validity counter 68 via conductive path 60b to control the duration of the calibration sequence.

The calibration controller further communicates with an increment counter 67 via conductive path 67a and a decrement counter 69 via conductive path 69a, to maintain the photo-electric system in calibration throughout an operating period as will be described below.

The calibration controller 60 also communicates with a zero crossing detector 61 which issues a synchronizing pulse on conductive path 61a. This synchronizing pulse is also conveyed to the pulse generator 58, the threshold generator 53 and the motor controller 64.

The motor controller 64 is activated by the signals received from:
 i) the photo-counter 62 on conductive path 62a and associated with front conveyor 14a;
 ii) a front push button switch 33a;
 iii) a rear push button switch 33b; and
 iv) a conveyor 'select' switch 33c.

In addition, the motor controller 64 receives two signals, each on conductive paths 71e and 71f from a pair of rear calibration units 71a and 71b, which in turn receive signals on conductive paths 71c and 71d from the two binocular optic devices 19a and 19b. The rear calibration units 71a and 71b operate in a similar fashion to calibration unit 50, in that the incoming signals from the binocular optic devices are calibrated, compared and counted. The signals on conductive paths 71d and 71e are similar to those on conductive path 62a.

Figure 23A:
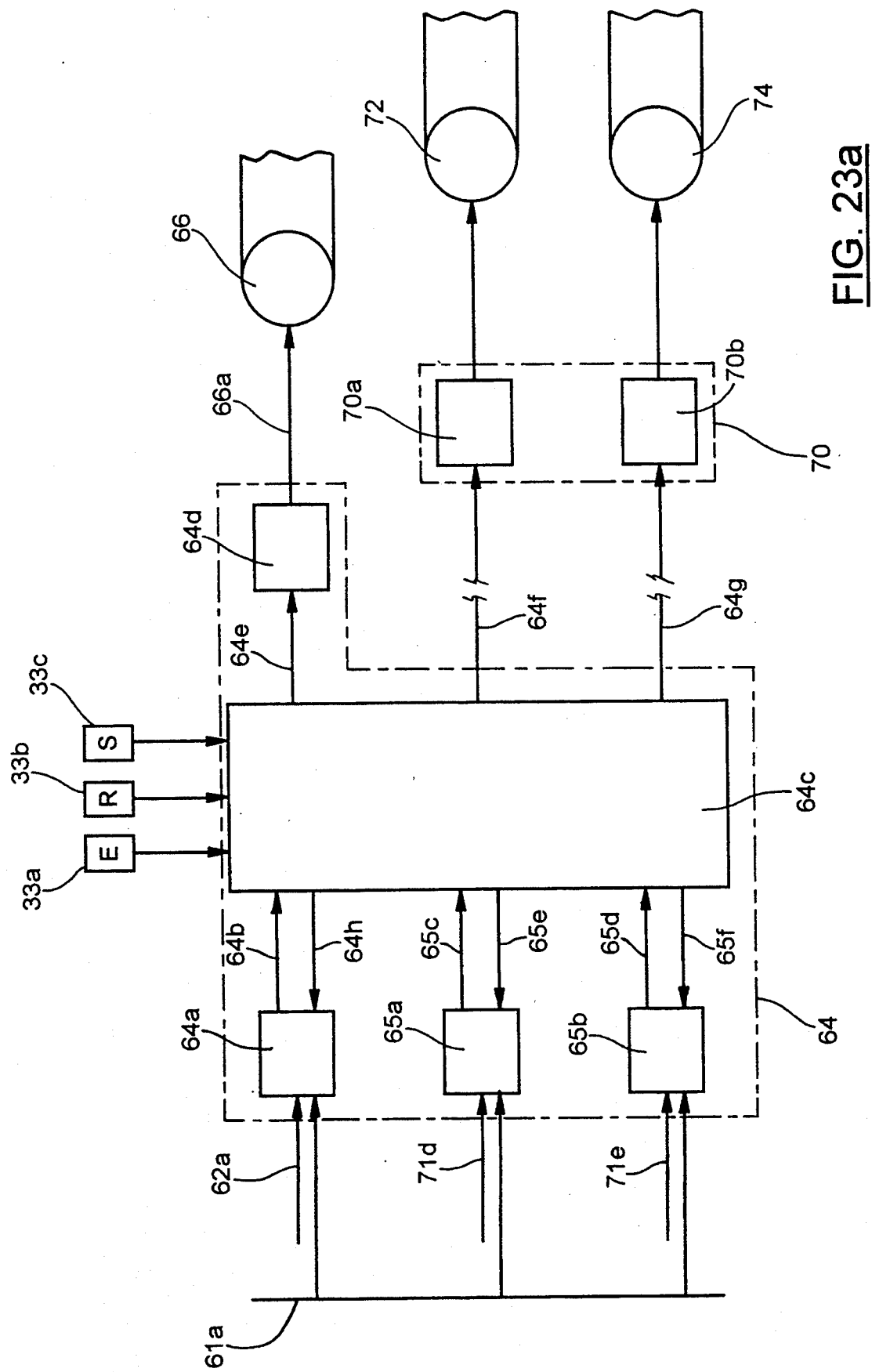
FIG. 23a is a schematic view of a motor controller segment of the portion illustrated in FIG. 23.

Referring to FIGS. 23 and 23a, the motor controller 64 includes timers 64a, 65a and 65b, motor control switch 64c, and motor actuator 64d which energizes motor 66. Rear controller 70 contains motor actuators 70a and 70b connected to motors 72 and 74 respectively.

The timer 64a receives an 'initializing' signal from the photo-counter on conductive path 62a and sends a corresponding signal to the switch 64c along conductive path 64b. This signal is routed to motor actuator 64d via conductive path 64e and then via path 66a to energize the front conveyor motor 66.

The timers 64a, 65a and 65b also receive the synchronizing pulse on conductive path 61a from the zero crossing detector 61 to advance the timers in a manner to be described.

The motor control switch 64c communicates with timer 64a via conductive path 64h to convey a command signal originating from the front push button switch 33a. In addition, the motor control switch 64c communicates with timers 65a and 65b via conductive paths 65e and 65f respectively, to convey command signals originating from the rear and select push button switches 33b and 33c respectively.

This arrangement allows a conveyor to be advanced while under control of its photo-detectors either:
a) for a predetermined time interval, or,
b) until the light path is again interrupted, at which point the photo-counter detects the presence of the object and sends a stopping signal on conductive path 62a to reset the timer and stop the conveyor.

In a similar manner, timers 65a and 65b, receiving signals from their respective photo-counters along conductive paths 71c and 71d, will send initializing signals to motor control switch 64c along conductive paths 65c and 65d and thereafter to their respective motor actuators 70a and 70b along conductive paths 64f and 64g. But as will be described, only one of motors 72 and 74 will be controlled by its own photo-counter and timer, while the other will respond to signals derived from the photo-counter 62.

The motor controller 64 may also receive a signal from the front push button switch 33a, the rear push button switch 33b or from the 'conveyor select' switch 33c.

Before discussing the general operation of the conveyor, it may be useful to focus on the technique by which optical signals are evaluated.

SENSITIVITY BAND

The pulse generator 58 pulses LED 38 to generate an LED light pulse as shown by curve 'a' in FIG. 24. The photo-transistor 40 receives the reflected pulse to generate a substantially constant current signal on path 40a, the magnitude of which is proportional to the strength of the reflected pulse of light. The capacitor receives the signal on path 52a and accumulates a charge as illustrated in FIG. 24 by curve 'b'.

Normally, optical systems such as this are designed to maximize the speed and amplitude of the signal and to detect only the presence of either a 'white' signal or a 'black' signal. The use of a capacitive load integrates the signal and in this case is particulary useful since a variation in signal amplitude can be converted to a variation in time.

In a particular installation, in which the optical alignment and selection of the LED and photo-transistor and other components has been previously established, the intensity of the light pulse returned to the photo-transistor from the reflective target will be nearly constant, exhibiting only minor variations due to ambient light conditions, temperature, etc. The time interval from the beginning of the LED pulse to switching of the comparator output will be similarly constant. The Sensitivity Band is a brief interval of time in the immediate vicinity of and centred upon the point in time corresponding to the time at which a signal representing an unobstructed view of the reflecting target will be issued from comparator 54, as illustrated by curve 24c. The Sensitivity Band is illustrated in FIG. 24d and has a plurality of successive sectors of time, in this case five, corresponding to successive variations in the strength of the received optical signal.

The Sensitivity Band is positioned in time so that a central sector corresponds to a received optical signal of a given magnitude. In this case, one sector, namely sector 3, corresponds to the pulse generated by the target. The position of the Sensitivity Band may also be adjusted according to variations in the magnitude of the received optical signal, as further described in the section entitled 'Calibration'.

If the reflected pulse is relatively low in power, the slope of the capacitor charge curve is correspondingly low, thereby increasing the time to reach the threshold at which the comparator switches. The counter 56 counts the time increments from the instant the LED emits the pulse of light to the time the capacitor reaches its threshold causing the comparator output to switch.

It follows that a reduction in reflected pulse strength will move the count toward sector 5 or beyond into the 'black' region. In other words, if a nonreflective or 'black' object is interrupting the light path (as would occur if a consumer item is passed by the conveyor into the light path) the count would move into the 'black' region. If the 'black' object is then removed from the light path, the target reflects a greater quantity of light, increasing the slope of the capacitor charge and ultimately restoring the count to the 'white' region.

Figure 25:
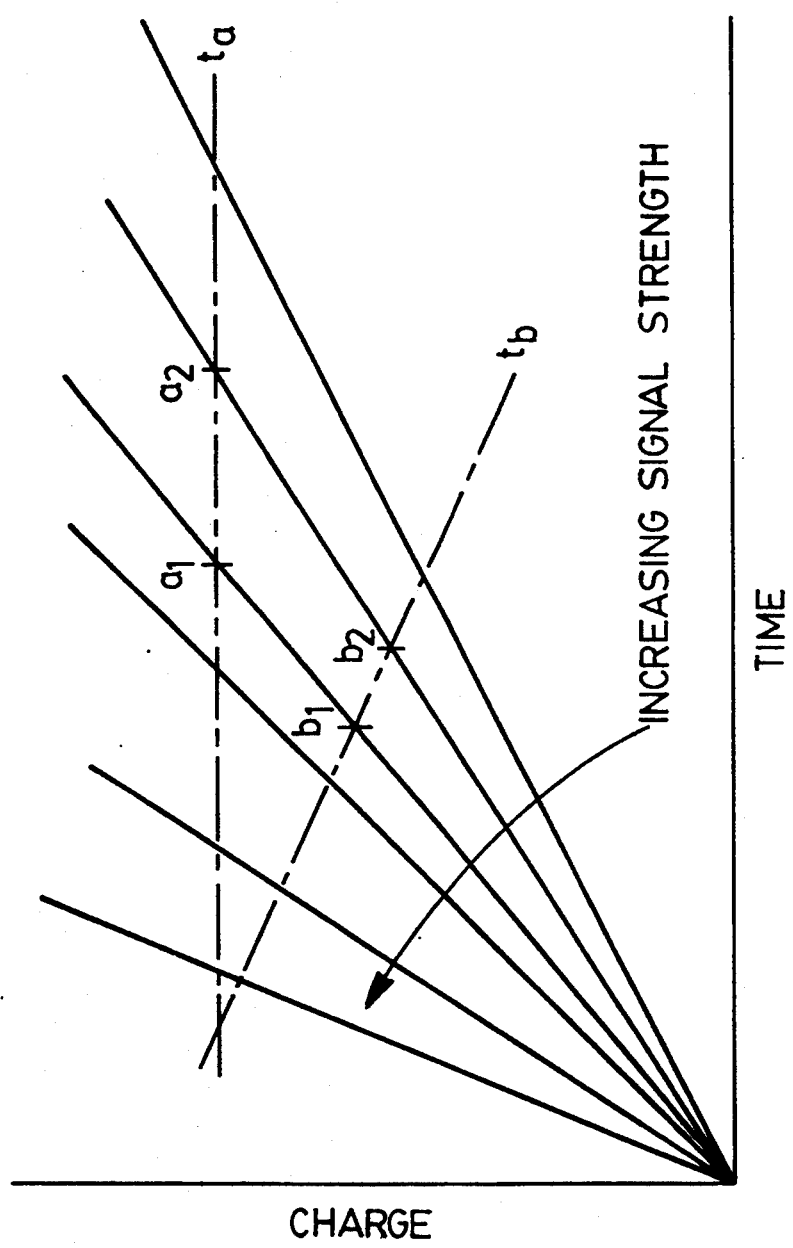
FIG. 25 is a graph representative of time versus capacitor charge.
Figure 26A:
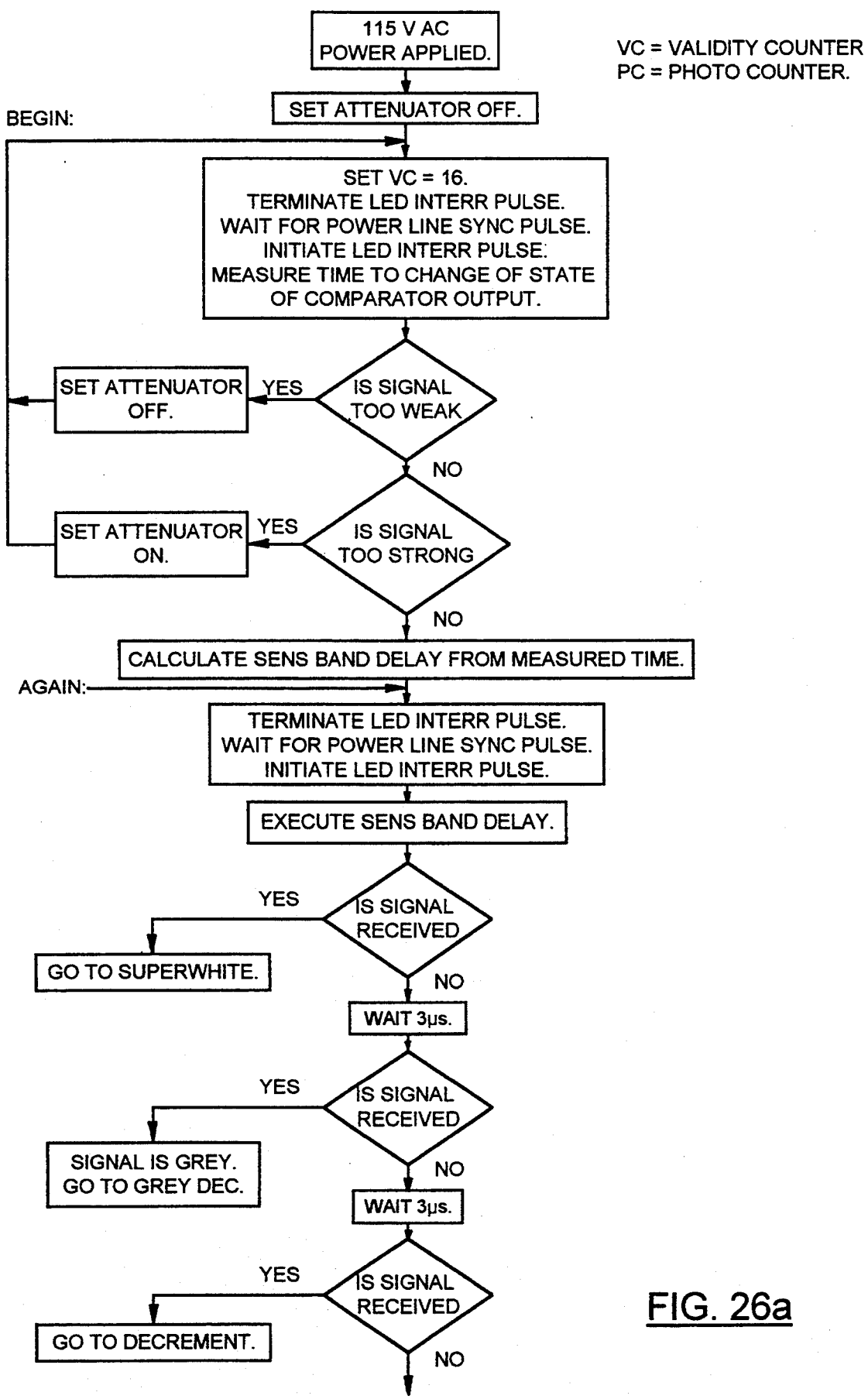
Figure 26B:
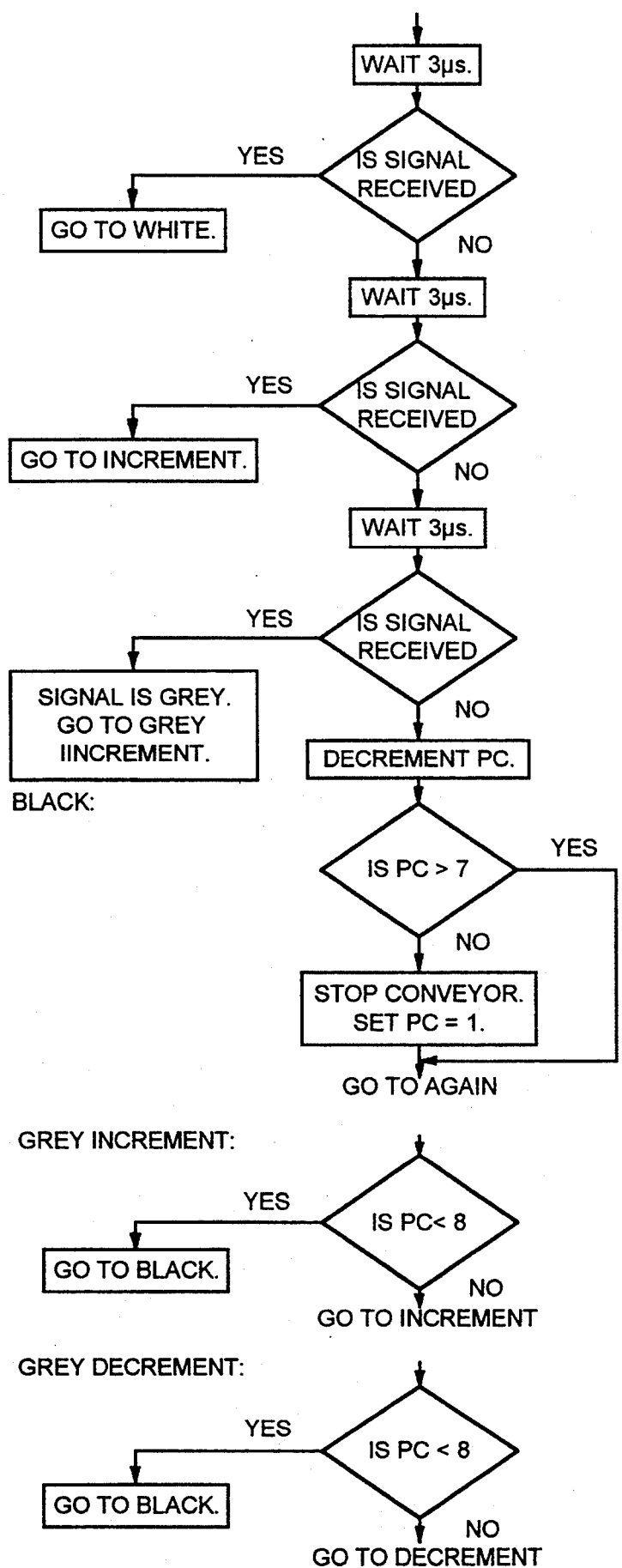
Figure 26D:
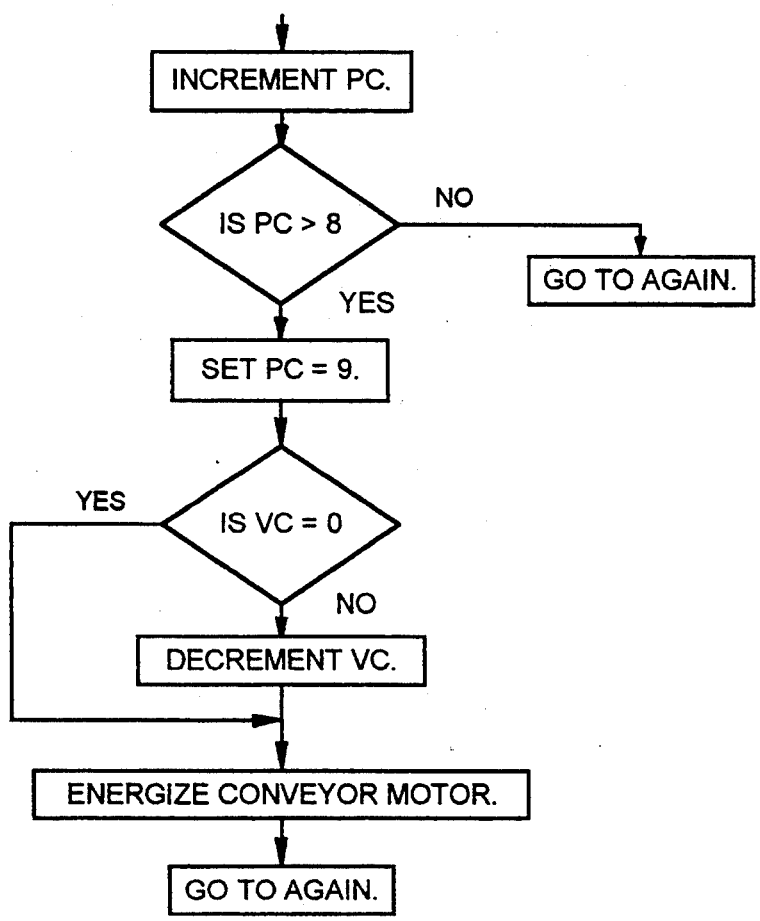

The threshold generator produces a varying bias voltage threshold level as shown by a downward chain dotted curve in FIG. 24. With this feature, an increment of time can be made to represent a larger change in signal strength, than it would if the threshold were constant. For example, as is desirable for a check-stand application, a time delay of one microsecond can represent a change in signal strength of approximately one percent rather than merely a fraction of a percent. Referring to FIG. 25, it can be seen that the time interval, between intersections $b_1$ and $b_2$ representing the times of detection for two different signals using the downwardly sloping threshold, is clearly shorter than the time interval between intersections $a_1$ and $a_2$ for the same signals against the constant threshold.

Although unlikely, certain consumer items, such as metal cans, may present a flat mirror like surface in a plane very nearly parallel to the reflective tape. If this occurs an amount of light exceeding that from the reflective tape may be received by the photo-transistor and the count in counter 56 will be reduced still further into the 'super-white' region. For a check stand application, super-white signals are preferably considered to represent an object on the conveyor and are therefore treated as black signals.

Thus, rather than detecting simply a white signal and a black signal, the present technique provides a conversion of signal strength into a time based spectrum of signals ranging from 'super-white' to 'black'. The number of time increments for each sector may be selected as desired, depending on the application for which the calibration system is intended. For example, if there is a high variability in ambient light, as may occur in a check-stand application, it may be desirable to select a higher number of time increments in those sectors considered to be 'target', specifically the 'increment', 'white' and 'decrement' sectors, as will be described. The preferred technique to provide this time based Sensitivity Band is to cause the counter to interrogate the comparator on a repeated basis after a predetermined delay period (referred to as a Sensitivity Band delay).

VALIDITY COUNTER

The validity counter 68 governs the duration of the calibration sequence and is only used immediately following application of power while establishing the position (in time) of the Sensitivity Band. Each time the received signal falls within the 'target' sectors 2 to 4 in the Sensitivity Band, the validity counter is decremented by one. This means that after a preset number of 'target' signals is received, the validity counter is decremented to zero to end the calibration sequence.

PHOTO-COUNTER

The photo-counter determines when the occurrence of a 'white' or 'black' signal should change the state of the conveyor. The photo-counter is advanced to an upper count limit after a given number of 'white' signal detections and to a lower count limit after a given number of 'black' signal detections. For example, if it is assumed that at a particular point in time, the photo-counter has a count of 9, which represents conditions of no objects on the conveyor to block the photo-beam and conveyor running:
 i) two successive black (or super-white) counts reduce the photo-counter count to 7, verifying that the light path has been interrupted by an obstacle and stopping the conveyor. The photo-counter is then preset to, and returned to, a count of 1 for every succeeding 'black' signal;
 ii) a number of successive white counts, say 7, can be taken to verify that the light path has become clear of obstacles, thereby advancing the photo-counter to 8 and starting the conveyor to advance the next obstacle toward the light path. The photo-counter will then be preset to, and returned to, a count of 9 for successive white signals.

OPERATION

Briefly described, the calibration controller adjusts the Sensitivity Band delay on each interrogation. In a simplified example, this is done by:
 i) decrementing the Sensitivity Band delay (that is reducing the count corresponding to the onset of sector 1) if the comparator output switches in sector 2;
 ii) incrementing the Sensitivity Band delay if detection occurs in sector 4; or
 iii) leaving the Sensitivity Band delay unchanged if detection occurs in any sector other than 2 or 4.

In effect, the calibration unit considers the detection of the signal within any of sectors 2, 3 or 4 to represent an unobstructed view of the target (white).

Signals detected in sectors 1 and 5 are classified 'grey' and assigned the same value as the previously established condition. For example:
 i) if the photo-counter is at a count of 8 or 9, a signal detected in sector 1 or 5 is considered to represent the target, and classified as falling in sector 2 or 4 respectively.
 ii) if the photo-counter is at a count less than 7, a signal detected in sectors 1 or 5 is considered to represent an object on the conveyor and classified black.

For an application such as a check-stand, the grey sectors are useful to provide hysteresis and to avoid ambiguity in a 'white/black' or conveyor start/stop decision. Signals detected earlier than sector 1 or later than sector 5, referred to as super white and black respectively, are considered to result from objects on the conveyor and both are classified black.

Thus, the present technique is capable of making calibration adjustments to the time base to accommodate minor variations as can occur in any electrical installation and the need for manual calibration mechanisms is eliminated.

Meanwhile, the photo-counter verifies the presence or absence of objects on the conveyor, allowing a change of state of the conveyor only if a preset number of 'white' or 'black' signals are obtained. The speed of modern electronic components allows these multiple signals to be measured in a mere fraction of a second and thus does not impose a recognizable delay to the user. For example, the calibration unit may be configured to interrogate the LED 60 times per second. Therefore, for a typical conveyor speed of 6.6 inches per second, each interrogation pulse is equivalent to a conveyor travel of 0.11 inch.

The control module functions as shown in the flow diagrams of FIGS. 26a to 26d. On power up, the attenuator is set to 'off' and the calibration controller passes the 'Begin' step, after which:
 i) the validity counter is set to 16;
 ii) the calibration controller waits for the next power line synchronizing pulse, at which point;
 iii) the pulse generator interrogates the LED with a pulse (typically 300 microseconds duration); and thereafter
 iv) the calibration controller waits for a count from the counter 56.

If the count from the counter is greater than a certain limiting value, say to correspond to a delay of 285 microseconds, the calibration controller determines that the signal is 'too weak' and reverts the sequence to the 'Begin' step, switching the attenuator to 'off' if applicable.

If the count from the counter is below a minimum value, say to correspond to a delay of 150 microseconds, the calibration controller determines that the signal is 'too strong' and switches the attenuator to 'on' and reverts the sequence back to the 'Begin' step.

If repeated signals are either too weak (as may occur for example if the photo-sensor light beam is blocked) or too strong (as may occur for example if the system contains defective components), the routine described above will be executed repeatedly and the conveyor will remain stopped.

If however, the signal is neither 'too weak' nor 'too strong' the calibration controller derives the Sensitivity Band delay from the counter output and passes to the 'Again' step of the sequence. Here:
  i) the pulse generator terminates the interrogation pulse of the LED;
  ii) the calibration controller waits for the next synchronizing pulse; at which point,
  iii) the pulse generator interrogates the LED with a pulse.

With the Sensitivity Band delay established, the controller executes a Sensitivity Band Routine, wherein the counter waits for the comparator output to switch. The counter interrogates the comparator output six times, for the most part immediately before the end of each of the sectors of the Sensitivity Band. The calibration controller initiates different subroutines depending on where in the Sensitivity Band the comparator output switches.

If the comparator output has switched prior to the first interrogation (corresponding to the super-white sector of the Sensitivity Band), the calibration controller advances the sequence to the Super-white subroutine, wherein:
  i) if the validity count is '0', then the calibration controller determines that the super-white signal is to be considered 'black' and advances the sequence to the 'Black' subroutine as will be described;
  ii) if the validity count is not '0', the calibration controller increments the validity counter by '4';
  iii) if the validity count then becomes greater than '15', the calibration controller reverts the sequence to the 'Begin' step; or
  iv) if the validity count is less than '16' the calibration controller reverts the sequence to the 'Again' step.

If the comparator output has switched by the second interrogation (corresponding to the first sector of the Sensitivity Band), the calibration controller determines that the signal is 'grey' and branches to execute the 'Grey Decrement' subroutine, wherein:
  i) if previously detected signals were deemed equivalent to 'target', the Grey Decrement signal is also classified as 'target' and the sequence is routed to the Decrement subroutine as will be described;
  ii). Alternatively, if previously detected signals were 'black', the sequence is directed to the Black subroutine.

Similarly if the comparator output has switched by the third interrogation (corresponding to the second sector of the Sensitivity Band), the calibration controller considers this to be a 'target' signal but determines that a Sensitivity Band delay adjustment is necessary. As a result, the calibration controller increases the 'Decrement' counter by one count, then if overflow occurs, reloads the Decrement Counter to a predetermined count, decrements the Sensitivity Band Delay and advances the sequence to the 'white' subroutine.

The Decrement counter serves the purpose of making the Sensitivity Band delay adjustment less reactive to abrupt changes to the lighting conditions. In this manner, the system is made less erratic. For example, the decrement counter may if desired have a count as high as 256, which can represent a real time delay of about 4 seconds for the counter to run its course and become 'overflowed' as will be referred to below.

If increasing the Decrement Counter does not cause an overflow the sequence is advanced directly to the 'white' subroutine, wherein:
  i) the calibration controller increments the photo-counter by '1'; and thereafter
  ii) if the photo-counter count is less than 8, the calibration controller reverts the sequence to the 'Again' step;
  iii) if the photo-counter count is greater than 7, the calibration controller advances the photo-counter count to '9'; and thereafter
  iv) if the validity count is '0', the motor control unit energizes the conveyor motor to advance the conveyor and the calibration controller reverts the sequence to the 'Again' step; or
  v) if the validity count is not '0', meaning that the process of initializing the Sensitivity Band Delay is not fully completed, the calibration controller decrements the validity counter by '1', the motor control unit energizes the conveyor motor to advance the conveyor and the calibration controller reverts the sequence to the 'Again' step.

If the comparator output switches in the fourth interrogation (corresponding to the third sector of the Sensitivity Band), the calibration controller determines that the signal is 'white' and moves the sequence to the 'White' subroutine as described above, effecting no adjustment to the Sensitivity Band delay.

If the comparator output switches in the fifth interrogation, the calibration controller determines that the signal is falling in the fourth sector and considers this to be a 'target' signal. However, the calibration controller determines that a Sensitivity Band delay adjustment is necessary. As a result, the calibration controller increases the 'Increment' counter by one count, then if overflow occurs, reloads the Increment Counter to a predetermined count, increments the Sensitivity Band Delay and advances the sequence to the 'white' subroutine.

As with the Decrement counter, the increment counter serves the purpose of making the Sensitivity Band delay adjustment less reactive to abrupt changes to the lighting conditions.

If increasing the Increment Counter does not cause an overflow the sequence is advanced directly to the 'white' subroutine, as described above.

If the comparator output switches in the sixth interrogation, the calibration controller determines that the signal is falling in the fifth sector and thus is a 'grey' signal. Therefore, the calibration controller diverts the sequence to the Grey Increment Subroutine. As for the Grey Decrement signal, either the Increment or Black subroutine will then be executed.

If the comparator output switch has still not switched after the sixth interrogation, the calibration controller determines that the signal is 'black' and advances the sequence to the 'black' subroutine; wherein:
  i) the photo-counter is decremented by '1'; and thereafter
  ii) If the photo-counter count is greater than 7, the calibration controller advances the sequence to the Again step;
  iii) If the photo-counter count is less than eight, the photo-counter signals the motor control unit to stop the conveyor, at which point, the photo-counter is reset to '1' and the calibration controller reverts the sequence to the 'Again' step.

The conveyor 'select' switch enables the check-stand operator to designate one of the two rear conveyors as selected and the other non-selected. The rear conveyors operate in two control modes as follows:

i) Selected: In this case, the selected rear conveyor is jogged, say for 1.25 seconds each time the front belt is stopped by the detection of an obstacle in the light path. Although the motor control switch 64c prevents the 'selected' conveyor from responding to the photo-sensors monitoring its own downstream end, calibration unit 71 will continue to perform all functions required to correctly update the photo-counter and Sensitivity Band Delay.

ii) Non-selected: The non-selected conveyor operates under control of its own photo-sensors and timing control in exactly the same manner as the front conveyor.

At the conclusion of the check through process, the operator may operate the 'select' switch to obtain selection of the other rear conveyor. In this event, the previously 'selected' conveyor will become 'non-selected' and thus controlled by its own photo-sensors. Meanwhile the previously 'non-selected' conveyor will become 'selected' and be caused to jog on each occasion that the front light path becomes obstructed.

For a single rear conveyor check-stand it can be arranged that the same conveyor is re-selected following operation of the select switch. In this event, a fast take away action will be obtained to quickly remove the checked items to the bagging area, before the jog mode is resumed for checking the next customer's purchases.

The front and rear push button switches, 33a and 33b respectively, are a 'momentary action' type allowing the operator to generate command signals to override automatic control of the conveyors. The switches operate in two modes:

i) when a front or non-selected rear conveyor is running, briefly depressing the appropriate switch, that is switch 33a for the front conveyor or switch 33b for the non-selected rear, will immediately halt a respective conveyor;

ii) when a front or non-selected rear conveyor is not running, depressing and holding the appropriate push button switch will cause the conveyor to be advanced for as long as the appropriate switch is maintained, that is switch 33a for the front conveyor and switch 33b for the non-selected rear conveyor. The halted conveyor will revert to automatic operation when its light path is interrupted.

The additional push button switches 19e and 19f associated with left and right rear conveyors respectively may be located near the bagging area to enable a customer to manually advance the non-selected conveyor.

A particular feature of the motor controller 64 is that it may be easily adapted to check-stands having a number of different configurations, ranging from a single conveyor to as many as five or more conveyors. These include a single rear conveyor case where the 'selected' and 'non-selected' operating modes are applied to the same conveyor (rather than between two rear conveyors as described above).

While the conveyor control device 18 has a connector unit located along the bottom of the recess and a mating connector on the bottom of the housing, it will of course be understood that the connectors may be located on the side wall of the housing and the inner side wall of the recess. It will also be understood that the conveyor control device may be located instead on the side face of the side wall 16b, provided of course that it is positioned near the top face and sufficiently close to the operator for easy operation. The conveyor control device may also hinged to the side wall in order to be moved into a shallow exposed recess exposed in the side wall, as opposed to the relatively narrow deep recess as described above.

While the conveyor control device 18 disclosed above has apertures which are aligned with similar apertures in the side wall, the optical means may instead be directed through some other passage,. For example, the housing of the conveyor control device may have a suitable side wall which itself may form a portion of the inner side wall of the conveyor.

While the conveyor control device described above employs the binocular optic device for reflective sensing as its optical means, other optical arrangements may be used instead of the binocular optic device. For example, the optical arrangement may if desired include separate light emitting and receiving assemblies plugged into the housing and mounted on opposites of the conveyor.

While the present binocular optic device includes vanes to confine the light pathways for the optical elements, the vanes may perhaps be replaced by an array of holes, an optical fiber bundle, other formed passageways, or for that matter an array of alternating transparent and opaque regions in an object placed immediately in front of the optical elements, which will restrict the light pathways in a similar manner to the vanes.

The binocular optic device may be used in a number of other applications beyond its use within the control unit, in order to optically isolate optical elements.

While the calibration technique described above to generate the sensitivity band has been restricted to use in an optical system for a conveyor, it will be understood that the technique may be suitable to a number of other applications. For example, the technique may be perhaps be used to detect and quantify the changes in optical signals, such as contrast meters, photometers and the like. This technique may also be suitable in the detection of colours.

While the optical device described above makes use of a single LED producing a two stage optical signal, a pair of LED's may be used, one of which provides the first stage and the other of which provides the second stage. To give greater precision, the LED which provides the first stage may be continually energized. Given that the purpose of the first stage of the signal is to minimize the variation in sensitivity of the phototransistor, the LED which provides this first stage may, if desired, be integrally formed with or be located adjacent to the phototransistor.

The above embodiments make use of a sensitivity band whose position in time is changed with corresponding changes to the magnitude of the received optical signal. However, it may be equally feasible to instead adjust the intensity of the generated optical signal in order to maintain the received optical signal at a substantially constant magnitude, bearing in mind that fluctuations in the received optical signal will occur due to such things as ambient light. This may be done, for example, by having the calibration controller 60 communicate with the resistor arrangement 59 by way a conductive path shown in dashed lines at 59a

We claim:

1. A retail check stand device, comprising:

a conveyor and a pair of side walls, each of said side walls further including a side wall section presenting an inner planar surface on a respective side of said conveyor to confine articles thereon, one of said side wall sections having a cavity adjacent said planar surface;

sensing means for sensing objects on said conveyor;

an opening formed on said side wall section to provide access to said cavity; and a check stand controller responsive to said sensing means and arranged to fit through said opening and be located in said cavity.

2. A device as defined in claim 1 wherein said controller includes a housing with a cap portion, and switch means including a number of switches on said cap portion to operate said controller.

3. A device as defined in claim 2 wherein said opening is located near an operator location and said side wall section has a top face, further comprising mounting means for removably mounting said housing in said side wall section with said cap adjacent said top face so that said switch means are within reach of an operator, said mounting means and said housing being arranged to disable said controller when said housing is disengaged from said mounting means.

4. A device as defined in claim 3 further comprising a motor to drive said conveyor, a first electrical circuit contained within said housing and responsive to said sensing means for controlling said conveyor, a second electrical circuit to join said first electrical circuit with said motor, said first electrical circuit including a first connector portion positioned on said housing and said second electrical circuit including a second connector portion positioned in said cavity, wherein said first and second connector portions are disconnected when said housing is removed from said side wall section.

5. A device as defined in claim 4, further comprising at least one other conveyor, wherein at least one of the switch means controls said other conveyor.

6. A device as defined in claim 2 wherein said sensing means includes optical means for generating an optical signal, said optical means being contained within said housing and arranged to establish a light path across said conveyor.

7. A device as defined in claim 6 wherein said housing and said side wall section have aligned ports through which said light path extends.

8. A device as defined in claim 6 wherein said optical means includes a light emitting element and a light receiving element, both of which are associated with a reflective element positioned on an opposite side wall section, wherein said light path includes a first path segment from said light emitting element to said reflective element, and a second path segment from said reflective element to said light receiving element.

9. A device as defined in claim 8 wherein said optical means includes divergence control means to control the divergence angles of light emitted by the light emitting element or received by the light receiving element and thereby to minimize overlap of said first and second path segments.

10. A device as defined in claim 9 wherein said divergence control means includes a plurality of optical passages to be adjacent said light emitting element and a plurality of optical passages to be adjacent said light receiving element.

11. A device as defined in claim 10 wherein said optical passages are formed by a plurality of vanes.

12. A device as defined in claim 11 wherein said optical means includes a housing formed from a first housing portion and a second housing portion, wherein alternating ones of said vanes are disposed on said first and second housing portions to form said optical passages.

13. A binocular optic device comprising a housing to contain a light emitting element and a light receiving element, divergence control means to control the divergence angles of light emitted by the light emitting element and received by the light receiving element, thereby to define a first path segment for light emitted by said light emitting element and a second path segment for light received by said light receiving element and to minimize overlap of said first and second path segments, said divergence control means including a plurality of optical passages to be adjacent said light emitting element and a plurality of optical passages to be adjacent said light receiving element.

14. A binocular optic device as defined in claim 13, wherein said optical passages are formed by a plurality of vanes.

15. A binocular optic device as defined in claim 14 wherein said housing is formed from a first housing portion and a second housing portion, wherein alternating ones of said vanes are disposed on said housing portions.

16. A binocular optic device as defined in claim 15, wherein each of said vanes has a tapered cross section.

17. A controller for a retail check stand of the type having a pair of side wall sections, each with an inner planar surface on a respective side of said conveyor to confine articles thereon, one of said side wall sections further including a cavity adjacent said planar surface, said controller having a sufficiently small volume to be contained in said cavity.

18. A controller as defined in claim 17 wherein said controller includes a housing with a cap portion, and switch means including a number of switches on said cap portion to operate said controller.

19. A controller as defined in claim 18 further including within said housing, sensing means to detect the presence of objects on said conveyor.

20. A controller as defined in claim 19, wherein said side wall section has a top face, said controller further comprising mounting means for removably mounting said housing in said side wall section with said cap adjacent said top face so that said switch means are within reach of an operator, said mounting means and said housing being arranged to disable said controller when said housing is disengaged from said mounting means.

21. A controller as defined in claim 20, wherein said sensing means includes optical means for establishing a light path across said conveyor.

22. A controller as defined in claim 21, wherein said optical means includes a light emitting element and a light receiving element, both of which are to be associated with a reflective element positioned on an opposite side wall section, wherein said light path includes a first path segment from said light emitting element to said reflective element, and a second path segment from said reflective element to said light receiving element.

23. A controller as defined in claim 22, wherein said optical means includes divergence control means to control the divergence angles of light emitted by the light emitting element or received by the light receiving element and thereby to minimize overlap of said first and second path segments, said optical passages being formed by a plurality of vanes, said optical means includes a housing formed from a first housing portion and a second housing portion, wherein alternating ones of said vanes are disposed on said first and second housing portions to form said optical passages.

* * * * *